United States Patent
Kothinti Naresh et al.

(10) Patent No.: US 11,698,789 B2
(45) Date of Patent: Jul. 11, 2023

(54) RESTORING SPECULATIVE HISTORY USED FOR MAKING SPECULATIVE PREDICTIONS FOR INSTRUCTIONS PROCESSED IN A PROCESSOR EMPLOYING CONTROL INDEPENDENCE TECHNIQUES

(71) Applicant: Microsoft Technology Licensing, LLC, Redmond, WA (US)

(72) Inventors: Vignyan Reddy Kothinti Naresh, Morrisville, NC (US); Rami Mohammad Al Sheikh, Morrisville, NC (US); Shivam Priyadarshi, Morrisville, NC (US); Arthur Perais, Grenoble (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 17/068,253

(22) Filed: Oct. 12, 2020

(65) Prior Publication Data
US 2022/0113976 A1    Apr. 14, 2022

(51) Int. Cl.
*G06F 9/38* (2018.01)
(52) U.S. Cl.
CPC .......... *G06F 9/3844* (2013.01); *G06F 9/3806* (2013.01); *G06F 9/3861* (2013.01)
(58) Field of Classification Search
CPC ..... G06F 9/3806; G06F 9/3844; G06F 9/3861
See application file for complete search history.

(56) References Cited

U.S. PATENT DOCUMENTS 5,515,518 A    5/1996  Stiles et al.
5,584,001 A *  12/1996 Hoyt .................... G06F 9/3806
                                                    712/238

(Continued)

OTHER PUBLICATIONS

Skadron, "Characterizing and Removing Branch Mispredictions" Jun. 1999, 229 pages.*

(Continued)

*Primary Examiner* — David J. Huisman
(74) *Attorney, Agent, or Firm* — Withrow & Terranova, PLLC

(57) ABSTRACT

Restoring speculative history used for making speculative predictions for instructions processed in a processor. The processor can be configured to speculatively predict an outcome of a condition or predicate of a conditional control instruction before its condition is fully evaluated in execution. Predictions are made by the processor based on a history that is updated based on outcomes of past predictions. If a conditional control instruction is mispredicted in execution, the processor can perform a misprediction recovery by stalling the instruction pipeline, flushing younger instructions in the instruction pipeline back to the mispredicted conditional control instruction, and then re-fetching instructions in the correct instruction flow path for execution. The processor can be configured to restore entries of the speculative history associated with younger control independent (CI) conditional control instructions, so that younger fetched instructions that follow non-re-fetched CI instructions in misprediction recovery will use a more accurate speculative history.

26 Claims, 10 Drawing Sheets

(56) References Cited

U.S. PATENT DOCUMENTS

| | | | |
|---|---|---|---|
| 5,864,697 A * | 1/1999 | Shiell | G06F 9/3848 |
| | | | 712/240 |
| 6,108,777 A | 8/2000 | Puziol et al. | |
| 6,502,188 B1 * | 12/2002 | Zuraski, Jr. | G06F 9/3806 |
| | | | 712/234 |
| 7,363,477 B2 | 4/2008 | Srinivasan et al. | |
| 2004/0059897 A1 | 3/2004 | Rose et al. | |
| 2008/0209190 A1 | 8/2008 | Bhargava et al. | |
| 2015/0046691 A1 * | 2/2015 | Heil | G06F 9/3861 |
| | | | 712/240 |
| 2017/0262287 A1 | 9/2017 | Abdallah | |
| 2020/0394040 A1 | 12/2020 | Kothinti Naresh et al. | |

OTHER PUBLICATIONS

Al-Zawawi, "Transparent Control Independence (TCI)", 2007, 178 pages.*

Prémillieu et al., "SYRANT: SYmmetric Resource Allocation on Not-taken and Taken Paths", Nov. 2010, 31 pages.*

Akkary, Haitham et al., "Recycling Waste: Exploiting Wrong-Path Execution to Improve Branch Prediction", In Proceedings of the 17th annual international conference on Supercomputing, Jun. 23, 2003, pp. 12-21.

Gandhi, Amit et al., "Reducing Branch Misprediction Penalty via Selective Branch Recovery", In Proceedings of 10th International Symposium on High Performance Computer Architecture, Feb. 14, 2004, 11 Pages.

Ghandour, Walid J., "Dynamic Control Independence Predictor for Speculative Multithreading Processors", In Contemporary Engineering Sciences, vol. 2, Issue 11, Jan. 2009, 517-534.

Hilton, Andrew et al., "Ginger: Control Independence Using Tag Rewriting", In Proceedings of 34th International Symposium on Computer Architecture, Jun. 9, 2007, 12 Pages.

Michael, Christopher J. , "The Weakening Of Branch Predictor Performance As An Inevitable Side Effect Of Exploiting Control Independence", In Thesis of the Deparlment of Electrical and Computer Engineering, May 2010, 118 Pages.

Pajuelo, Alex et al., "Control-Flow Independence Reuse via Dynamic Vectorization", In Proceedings of the 19th IEEE International Parallel and Distributed Processing Symposium, Apr. 4, 2005, 10 Pages.

Quinones, Eduardo et al., "Improving Branch Prediction and Predicated Execution in Out-of-Order Processors", In Proceedings of 13st International Conference on High-Performance Computer Architecture, Feb. 10, 2007, pp. 75-84.

Rotenberg, Eric et al., "Control Independence in Trace Processors", In Proceedings of the 32nd Annual ACM/IEEE International Symposium on Microarchitecture, Nov. 16, 1999, 23 Pages.

Rotenberg, Eric et al., "Trace Processors", In Proceedings of the 30th annual ACM/IEEE international symposium on Microarchitecture, Dec. 1, 1997, 12 Pages.

"International Search Report and Written Opinion Issued in PCT Application No. PCT/US2021/041347", dated Nov. 23, 2021, 12 Pages.

Rotenberg, et al., "A Study of Control Independence in Superscalar Processors", In Proceedings Fifth International Symposium on High-Performance Computer Architecture, Jan. 9, 1999, 10 Pages.

* cited by examiner

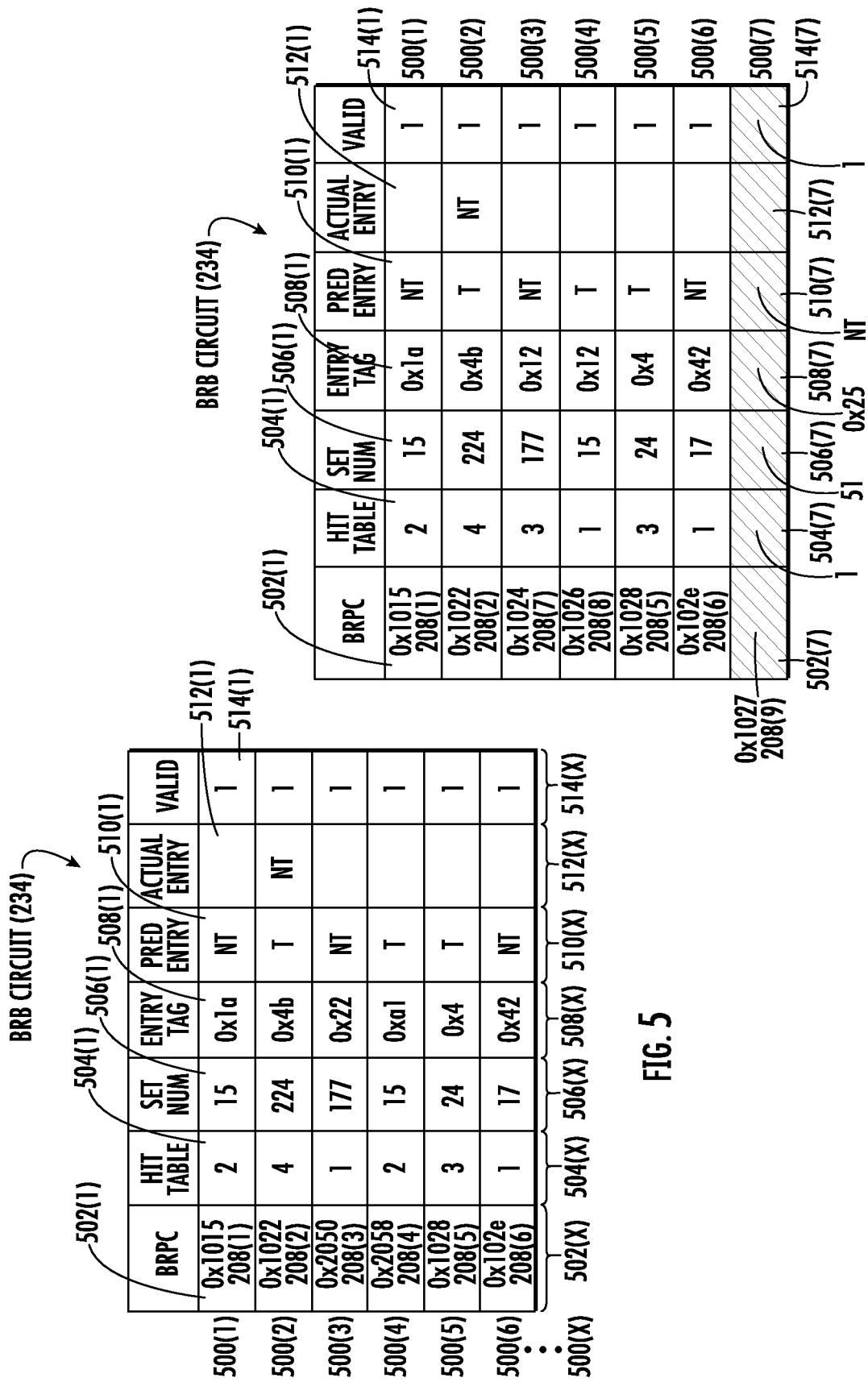

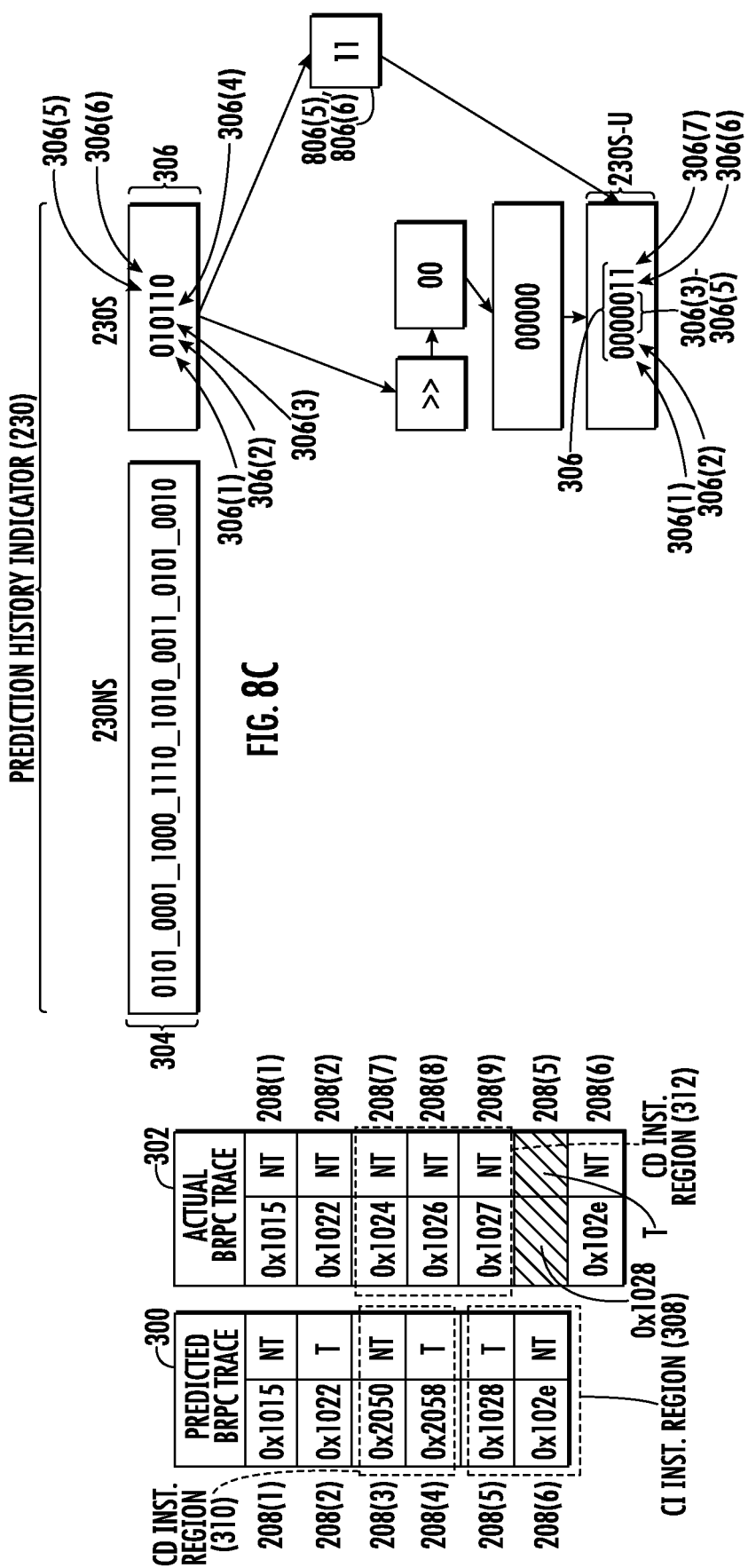

RESTORING SPECULATIVE HISTORY USED FOR MAKING SPECULATIVE PREDICTIONS FOR INSTRUCTIONS PROCESSED IN A PROCESSOR EMPLOYING CONTROL INDEPENDENCE TECHNIQUES

FIELD OF THE DISCLOSURE

The technology of the disclosure relates generally to speculative prediction of control flow computer instructions ("instructions") in an instruction pipeline of a processor, and more particularly to misprediction recovery after a speculative prediction of a control flow instruction is resolved at execution as a misprediction.

BACKGROUND

Instruction pipelining is a processing technique whereby the throughput of computer instructions being executed by a processor may be increased by splitting the handling of each instruction into a series of steps. These steps are executed in an execution pipeline composed of multiple stages. Optimal processor performance may be achieved if all stages in an execution pipeline are able to process instructions concurrently and sequentially as the instructions are ordered in the instruction pipeline(s). However, structural hazards can occur in an instruction pipeline where the next instruction cannot be executed without leading to incorrect computation results. For example, a control hazard may occur as a result of execution of a control flow instruction that causes a precise interrupt in the processor. One example of a control flow instruction that can cause a control hazard is a conditional branch instruction. A conditional control instruction, such as a conditional branch instruction, may redirect the flow path of instruction execution based on conditions evaluated when the condition of the control branch instruction is executed. As a result, the processor may have to stall the fetching of additional instructions until a conditional control instruction has executed, resulting in reduced processor performance and increased power consumption.

One approach for maximizing processor performance involves utilizing a prediction circuit to speculatively predict the result of a condition that will control the instruction execution flow path. For example, the prediction of whether a conditional branch instruction will be taken can be based on a branch prediction history of previous conditional branch instructions. When the control flow instruction finally reaches the execution stage of the instruction pipeline and is executed, the resultant target address of the control flow instruction is verified by comparing it with the previously predicted target address when the control flow instruction was fetched. If the predicted and actual target addresses match, meaning a correct prediction was made, delay is not incurred in instruction execution because the subsequent instructions at the target address will have been correctly fetched and already be present in the instruction pipeline when the conditional branch instruction reaches an execution stage of the instruction pipeline. However, if the predicted and actual target addresses do not match, a mispredicted branch hazard occurs in the instruction pipeline that causes a precise interrupt. As a result, the instruction pipeline is flushed and the instruction pipeline fetch unit is redirected to fetch new instructions starting from the target address, resulting in delay and reduced performance. This is also known as the "misprediction penalty." Also, stages in the execution pipeline may remain dormant until the newly fetched instructions make their way through the instruction pipeline to the execution stage, thereby reducing performance Misprediction in the processing of instructions in a processor is costly in terms of the resulting delay and reduced performance.

One method to lower the misprediction penalty is to utilize control independence techniques. Control independence (CI) refers to a region of instructions that executes regardless of an instruction control flow path direction. In other words, CI instructions are independent of the control decision by a branch. This is shown by example in an instruction stream 100 in FIG. 1 illustrated in the form of a flowchart 102. The instruction stream 100 includes a conditional branch instruction 104. The instruction execution flow path will either take flow path 106(1) or flow path 106(2) depending on the resolution of the condition (i.e., predicate) in the conditional branch instruction 104. A processor can speculatively predict the outcome of the predicate before the conditional branch instruction 104 reaches an execution stage in the instruction pipeline and go ahead and insert instructions in the predicted flow path into the instruction pipeline to be executed to avoid processing delay. Instructions 108(1), 108(2) that are in one of the two respective instruction control flow paths 106(1), 106(2) in a respective control dependent (CD) region 110(1), 110(2) of the instruction stream 100 are CD instructions 108(1), 108(2). CD instructions are instructions that are only executed dependent on the flow path 106(1), 106(2) taken based on the resolution of the predicate in the conditional branch instruction 104. There are other instructions 112 in a CI region 114 in the instruction stream 100 that are inserted in the instruction pipeline and get executed regardless of which instruction control flow path 106(1), 106(2) is taken as a result from the conditional branch instruction 104. These instructions 112 are also known as CI instructions 112. The CI instructions 112 can be further classified based on their data dependence on CD instructions 108(1) or 108(2) in the flow path 106(1), 160(2) taken in a respective CD region 110(1) or 110(2). If a CI instruction 112 (e.g., a load instruction) is dependent on data produced by a CD instruction 108(1) or 108(2) (e.g., a store instruction) in a CD region 110(1) or 110(2) of the instruction stream 100, the CI instruction 112 is a CI, data dependent (DD) (CIDD) instruction 112D; otherwise, it is a CI, data independent (DI) (CIDI) instruction 1121.

Control independence techniques performed when executing the instructions in the instruction stream 100 in FIG. 1 identify the CIDD instructions 112D among the CI instructions 112 in the CI region 114 of the instruction stream 100. Control independence techniques involve CIDD instructions 112D being re-executed as part of a misprediction recovery to guarantee functional correctness. This is because while the CIDD instructions 112D in the CI instructions 112 are inserted in the instruction pipeline to be executed by a processor regardless of the flow path 106(1), 106(2) taken, the CD instructions 108(1) or 108(2) that were executed based on speculative prediction of the conditional branch instruction 104 will not be executed in misprediction recovery. Instead, the CD instructions 108(1) or 108(2) that were not previously executed based on speculative prediction of the conditional branch instruction 104 will be executed in misprediction recovery. This means that the data produced by the CD instructions 108(1), 108(2) that were previously executed based on a speculative misprediction and consumed by CIDD instructions 112D may not be accurate. The misprediction recovery effectively adds CD produced data from the CD instructions 108(1) or 108(2)

that are executed in misprediction recovery. Thus, the misprediction recovery effectively "removes" the CD instructions 108(1) or 108(2) that were executed based on speculative misprediction, thus effectively removing their CD produced data. Thus, any load-based CIDD instructions 112D that were executed based on the speculative misprediction may have been based on stored CD data that was removed and/or other store CD data added prior to misprediction recovery. A load-based instruction is any instruction that performs a load operation to retrieve data from memory into a register.

To address the issue of CIDD instructions 112D having been executed based on later removed CD data in misprediction recovery, a processor can mark all load-based CI instructions 112 to be re-executed in misprediction recovery. In this manner, any added stored CD data that affects a load-based CIDD instruction 112D will be used in re-execution of the load-based CIDD instructions 112D in misprediction recovery.

SUMMARY

Exemplary aspects disclosed herein include restoring speculative history used for making speculative predictions for instructions processed in a processor. The processor is configured to speculatively predict a value associated with an operation. For example, the processor can be configured to speculatively predict an outcome of a condition or predicate of a conditional control instruction (e.g., a conditional branch instruction) before its condition is fully evaluated in execution. Predictions are made by a speculative prediction circuit in the processor based on a prediction history that is updated based on outcomes of past predictions. For example, if the outcome of a condition of a conditional control instruction is speculatively predicted and then later determined to have been previously mispredicted in execution, the processor can perform a misprediction recovery by stalling the instruction pipeline, flushing younger instructions in the instruction pipeline back to the mispredicted conditional control instruction, and then re-fetching instructions in the correct instruction flow path for execution. The processor is configured to restore a speculative portion of the prediction history ("speculative history") back to the mispredicted conditional control instruction in misprediction recovery and correct the misprediction in the speculative history for the mispredicted conditional control instruction. The speculative prediction of fetched younger conditional control instructions in the correct instruction flow path following the mispredicted conditional control instruction will re-update the speculative history. The restoration of the speculative history is performed to ensure that future conditional control instructions (or other speculations made based on the speculative history) have a correct historical context to provide accurate predictions. More accurate speculative predictions can result in less misprediction recoveries, thus reducing flush events, overhead and pipeline stalls associated with misprediction recoveries.

To avoid the need to flush all younger control independent (CI) instructions following a mispredicted conditional control instruction to improve recovery time in misprediction recovery, the processor can employ Control independence techniques. For example, Control independence techniques can involve identifying and replaying younger CI, data independent (DI) (CIDI) instructions in misprediction recovery without the need to re-fetch such CIDI instructions. This is because younger CIDI instructions are neither control dependent, nor data dependent on instructions that may have been fetched and processed from an incorrect instruction flow path following an older conditional control instruction. However, even with the processor employing Control independence techniques to avoid flushing younger CIDI instructions, the speculative history used to make a speculative prediction of a younger CIDI conditional control instruction may have been updated based on previously processed, younger control dependent (CD) conditional control instructions in the incorrect instruction flow path before misprediction recovery. This means that even with misprediction recovery, younger CIDI conditional control instructions that followed a CD conditional control instruction in the incorrect instruction flow path may have been predicted with an incorrect speculative history. Thus, if the speculative history is simply recovered, the speculative history will include information for predictions previously made for CIDI instructions before misprediction recovery when the incorrect instruction flow path was processed, because the CIDI instructions are not flushed.

Thus, in exemplary aspects disclosed herein, in addition to restoring the speculative history in misprediction recovery back to the mispredicted conditional control instruction, the processor can also be configured to restore entries of the speculative history associated with younger CI conditional control instructions. The entries of the speculative history associated with younger CI conditional control instructions may not be re-updated because all CI conditional control instructions may not be re-fetched and processed according to Control independence techniques performed by the processor. Thus, if the recovered entries of the speculative history associated with younger CI conditional control instructions are not restored, such entries of the speculative history associated with younger CI conditional control instructions may remain un-updated (e.g., treated as either all taken or not taken). Thus, in this instance, the entries of the speculative history associated with younger CI conditional control instructions will not be restored as part of the restored speculative history. This may cause younger fetched conditional control instructions after misprediction recovery that follow the non-re-fetched CI conditional control instructions in misprediction recovery to use a less accurate speculative history that includes non-restored speculative history information for the older non-re-fetched CI conditional control instructions. This can result in less accurate speculative predictions. By restoring the entries of the speculative history associated with younger CI conditional control instructions, younger fetched conditional control instructions that follow non-re-fetched CI instructions in misprediction recovery will use a more accurate speculative history that includes restored speculative history information for older non-re-fetched CI conditional control instructions.

In other exemplary aspects, in addition to restoring the speculative history of the mispredicted conditional control instruction and younger CI instructions, the processor can also be configured to correct the entries of the speculative history associated with younger CI conditional control instructions. The restored entries of the speculative history associated with younger CI conditional control instructions may not be accurate because such entries of the speculative history associated with younger CI conditional control instructions may have been based on previous updating of the speculative history from older CD instructions in an incorrect instruction flow path and/or older CI, data dependent (DD) (CIDD) instructions that are re-fetched and re-processed in misprediction recovery. Thus, if the recovered entries of the speculative history associated with younger CI conditional control instructions are not also corrected in addition to being restored, speculative predictions for younger fetched conditional control instructions that follow the non-re-fetched CI conditional control instructions in misprediction recovery may use a speculative history that includes a non-corrected speculative history entries for the older non-re-fetched CI conditional control instructions. This can result in less accurate speculative predictions. By correcting the entries of the speculative history associated with younger CI conditional control instructions, younger fetched conditional control instructions that follow non-re-fetched CI instructions in misprediction recovery will use a correct speculative history that includes corrected speculative history information for older non-re-fetched CI conditional control instructions.

In this regard, in one exemplary aspect, a processor is provided. The processor comprises an instruction processing circuit comprising one or more instruction pipelines. The processor also comprises a speculative prediction history indicator. The instruction processing circuit is configured to speculatively predict a condition in a conditional control instruction in an instruction stream in an instruction pipeline based on the speculative prediction history indicator. The instruction processing circuit is also configured to speculatively predict a condition of one or more CD conditional control instructions in a first CD instruction region following the conditional control instruction in the instruction stream. The instruction processing circuit is also configured to speculatively predict a condition of one or more CI conditional control instructions in a CI instruction region following the first CD instruction region in the instruction stream. The instruction processing circuit is also configured to update one or more CI prediction entries of the speculative prediction history indicator based on the respective speculative prediction of the one or more CI conditional control instructions in the CI instruction region. The instruction processing circuit is also configured to execute the conditional control instruction to resolve the condition of the conditional control instruction. In response to the speculative prediction not matching the resolved condition in execution of the conditional control instruction, the instruction processing circuit is also configured to store the one or more CI prediction entries of the speculative prediction history indicator, fetch one or more CD instructions in a second CD instruction region of the conditional control instruction based on the resolved condition of the conditional control instruction, speculatively predict a condition of one or more CD conditional control instructions in the second CD instruction region, and restore the stored one or more CI prediction entries in the speculative prediction history indicator.

In another exemplary aspect, a method of restoring speculative history used for making speculative predictions for conditional control instructions in a processor is provided. The method comprises speculatively predicting a condition in a conditional control instruction in an instruction stream in an instruction pipeline based on a speculative prediction history indicator. The method also comprises speculatively predicting a condition of one or more CD conditional control instructions in a first CD instruction region following the conditional control instruction in the instruction stream. The method also comprises speculatively predicting a condition of one or more CI conditional control instructions in a CI instruction region following the first CD instruction region in the instruction stream. The method also comprises updating one or more CI prediction entries of the speculative prediction history indicator based on the respective speculative prediction of the one or more CI conditional control instructions in the CI instruction region. The method also comprises executing the conditional control instruction to resolve the condition of the conditional control instruction. In response to the speculative prediction not matching the resolved condition in execution of the conditional control instruction, the method also comprises storing the one or more CI prediction entries of the speculative prediction history indicator, fetching one or more CD instructions in a second CD instruction region of the conditional control instruction based on the resolved condition of the conditional control instruction, speculatively predicting a condition of one or more CD conditional control instructions in the second CD instruction region, and restoring the stored one or more CI prediction entries in the speculative prediction history indicator.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is an instruction stream in flowchart form illustrating a conditional branch instruction, control dependent (CD) instructions that are executed dependent on the instruction control flow path taken from a prediction or resolution of the predicate of the conditional branch instruction, and control independent (CI) instructions that are executed irrespective of the instruction control flow path taken from the conditional branch instruction;

FIG. 2 is a diagram of an exemplary processor that includes an exemplary instruction processing circuit that includes a speculative prediction circuit configured to make a speculative prediction based on a speculative history, wherein the processor is configured to restore entries of the speculative history associated with younger CI conditional control instructions in misprediction recovery;

FIG. 3A is a diagram of an exemplary predicted branch recovery trace record illustrating conditional control instructions in order as fetched by the instruction processing circuit in FIG. 2 as an instruction stream into an instruction pipeline and a speculative prediction of the condition of each conditional control instruction made by the speculative prediction circuit for each conditional control instruction;

FIG. 5 is a diagram of an exemplary branch reorder buffer (BRB) circuit in the processor in FIG. 2 before misprediction recovery illustrating captured information about conditional control instructions in order as fetched by the instruction processing circuit in FIG. 2 as an instruction stream and a speculative prediction and actual resolved condition of each conditional control instruction;

FIG. 6 is a diagram of the BRB circuit in the processor in FIG. 2 after misprediction recovery illustrating an ordering violation of the conditional control instructions as compared to the conditional control instructions as fetched in an instruction stream into an instruction pipeline;

Figure 1:
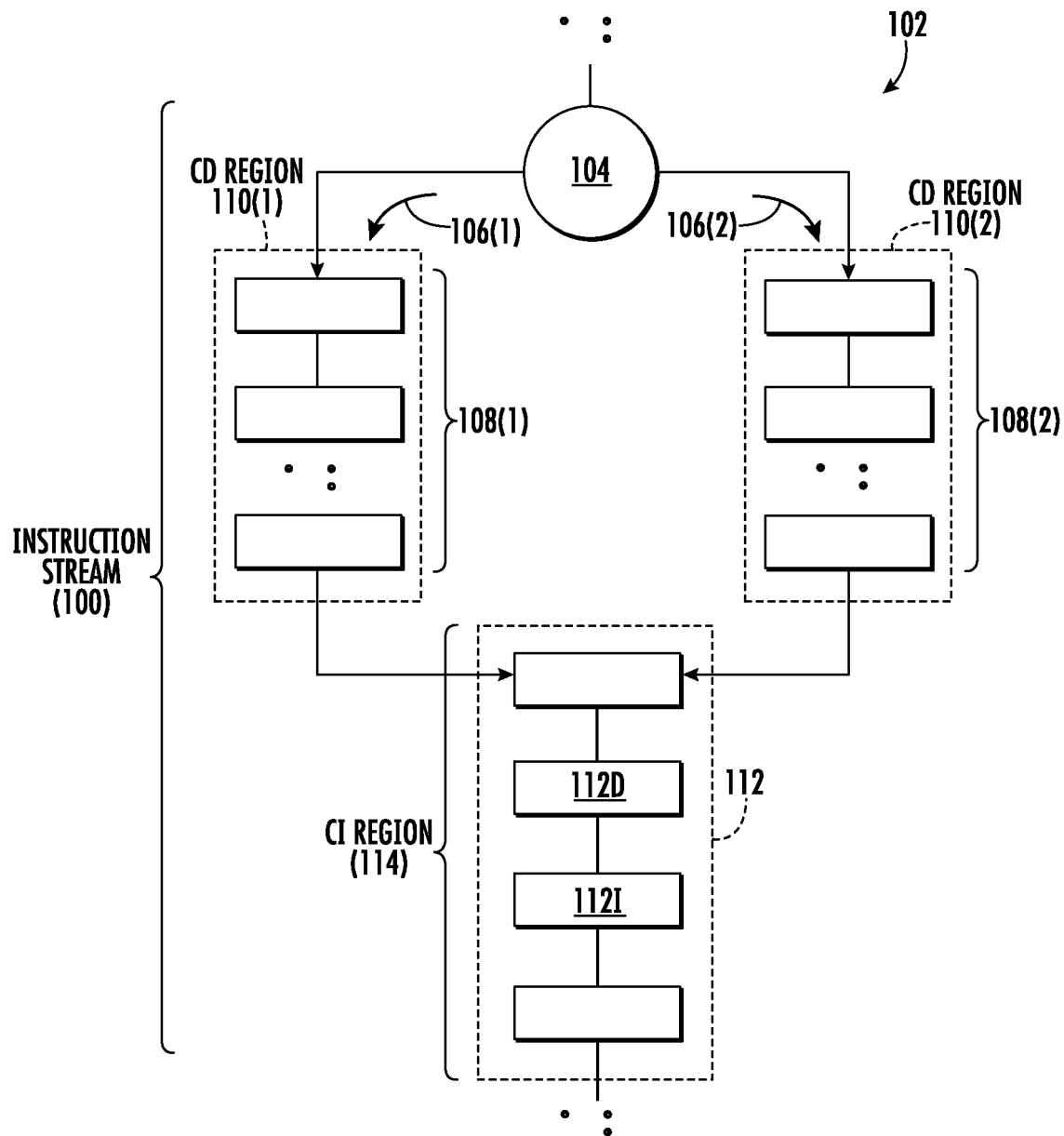
Figure 2:
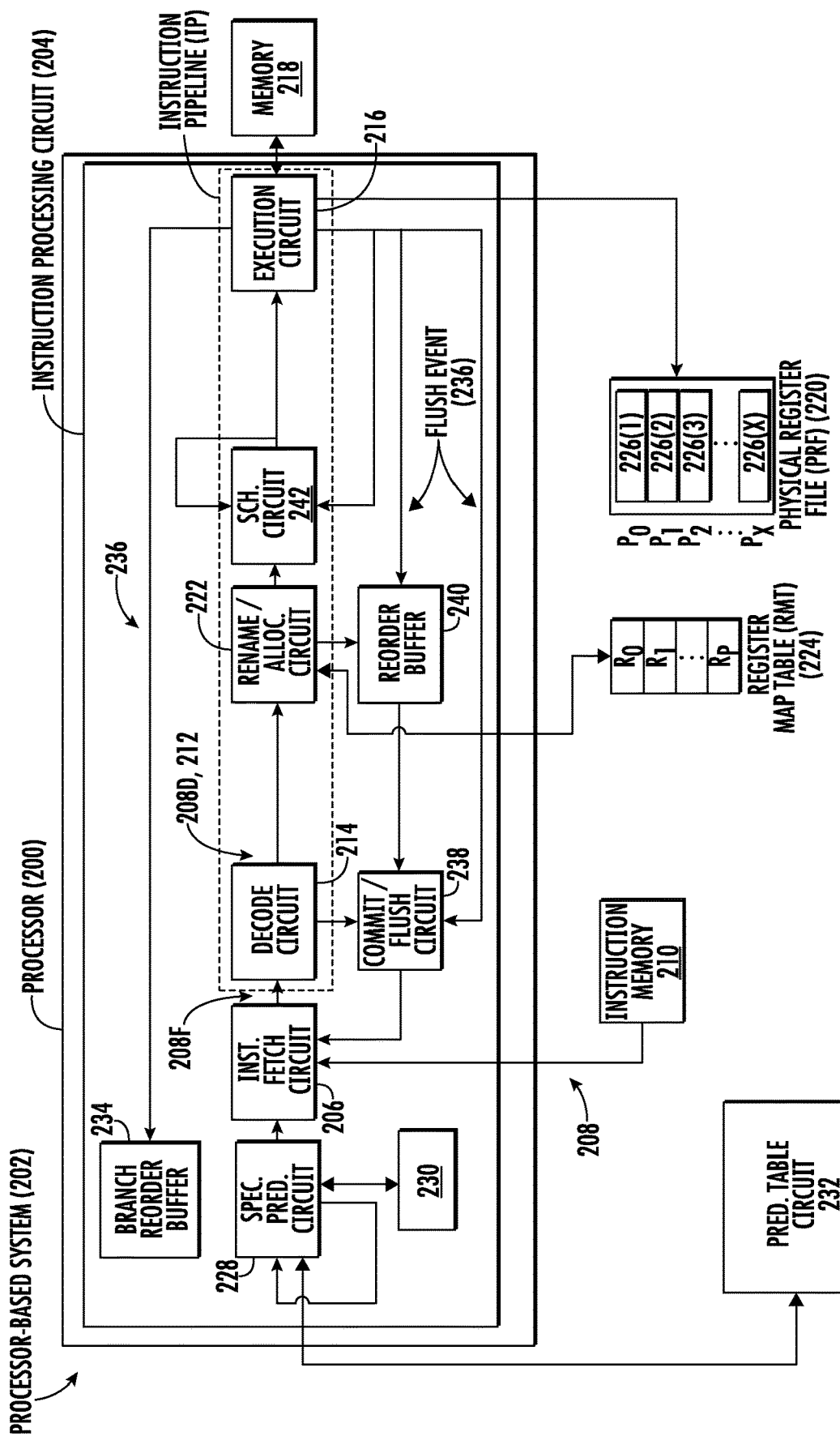
Figure 3:
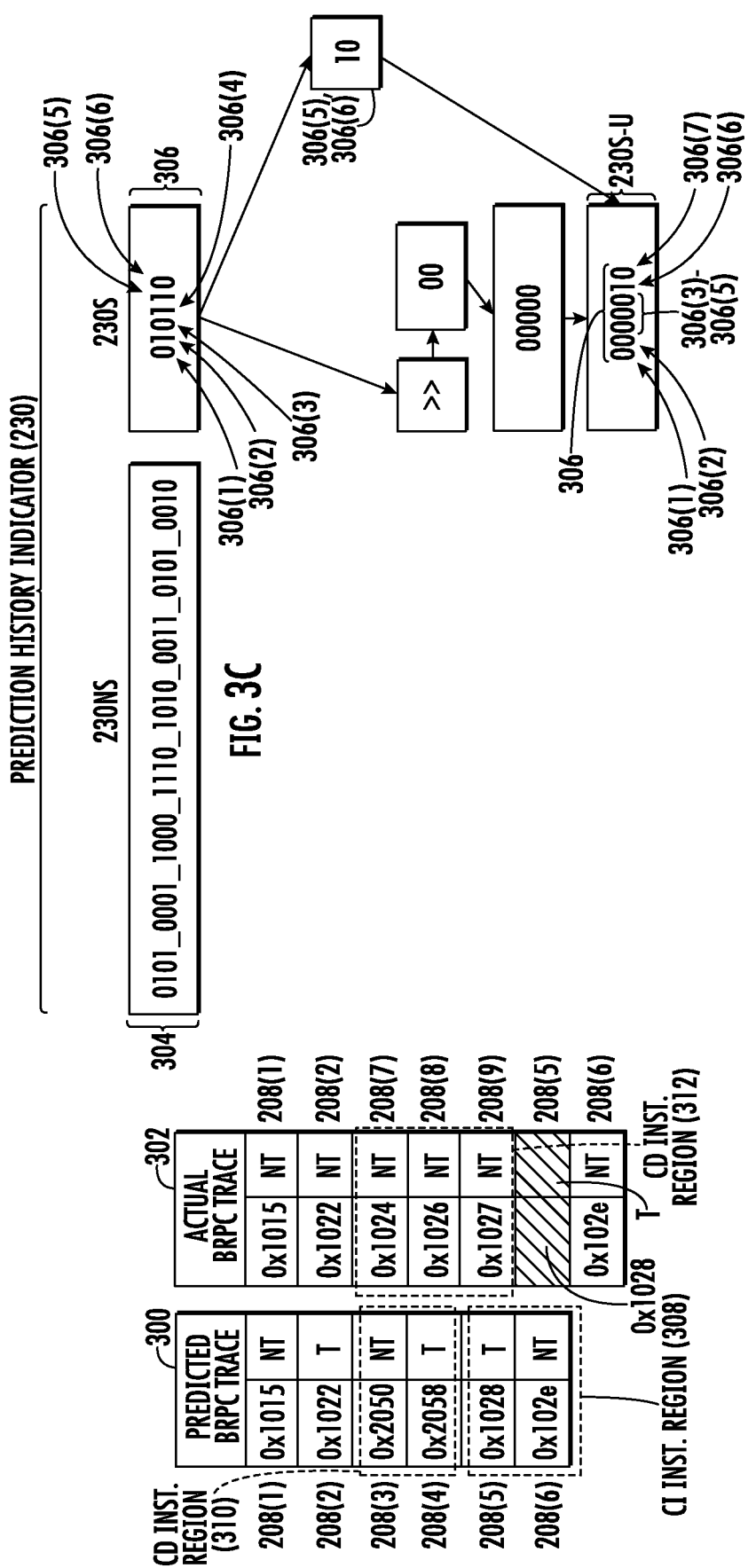
FIG. 3B is a diagram of an exemplary actual branch recovery trace record illustrating conditional control instructions in order as fetched by the instruction processing circuit in FIG. 2 as an instruction stream into an instruction pipeline and an actual resolved condition of the conditional control instructions in execution.
FIG. 3C is a diagram of an exemplary non-speculative history used by the speculative prediction circuit in FIG. 2 to make speculative predictions.
FIG. 3D is a diagram of an exemplary speculative history based on a speculative prediction of the conditional control instructions in FIGS. 3A and 3B, before a misprediction recovery used by the speculative prediction circuit in conditional control instructions in FIG. 2 to make speculative predictions, and a restored speculative history resulting from misprediction recovery.
Figure 7A:
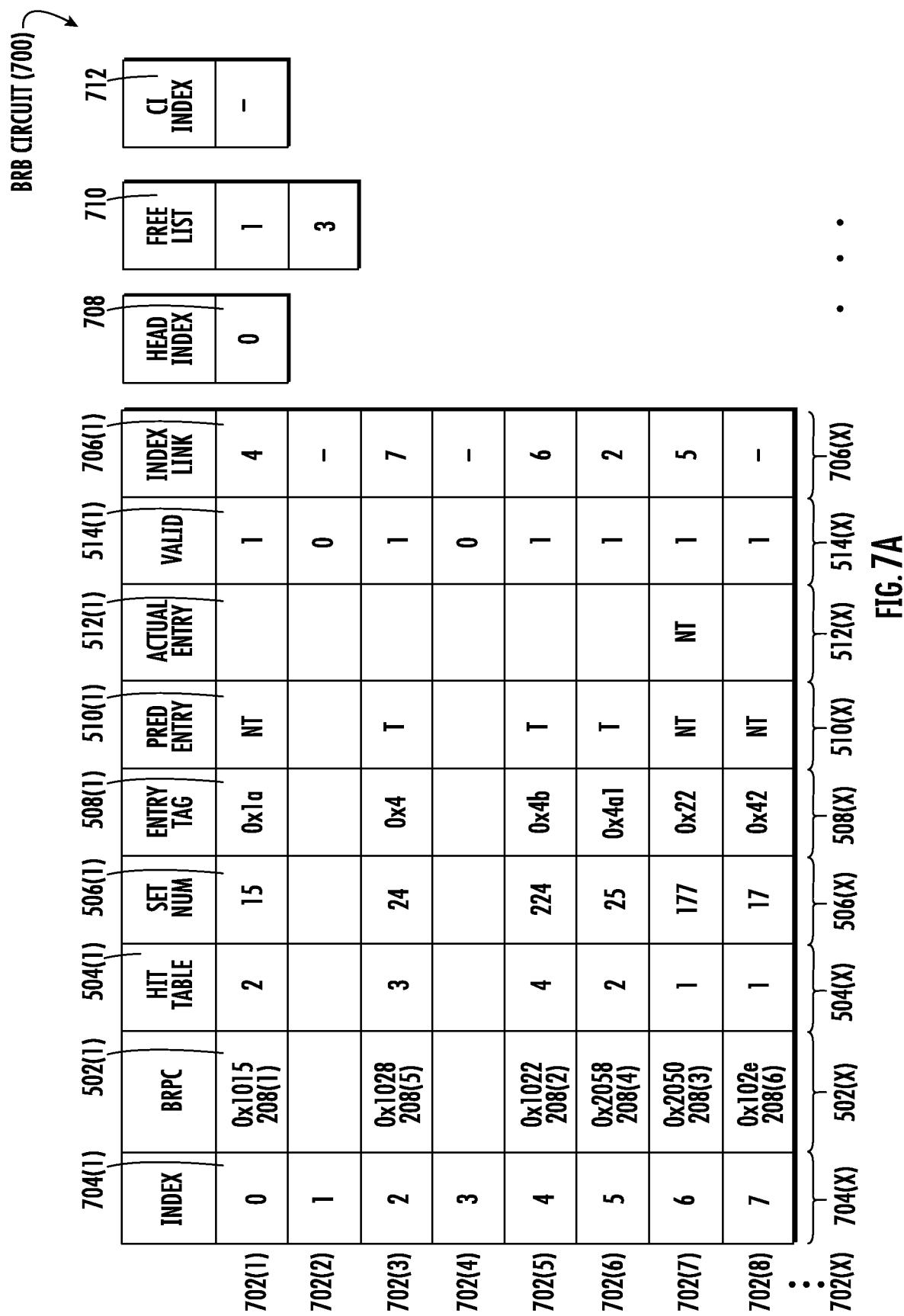
Figure 7B:
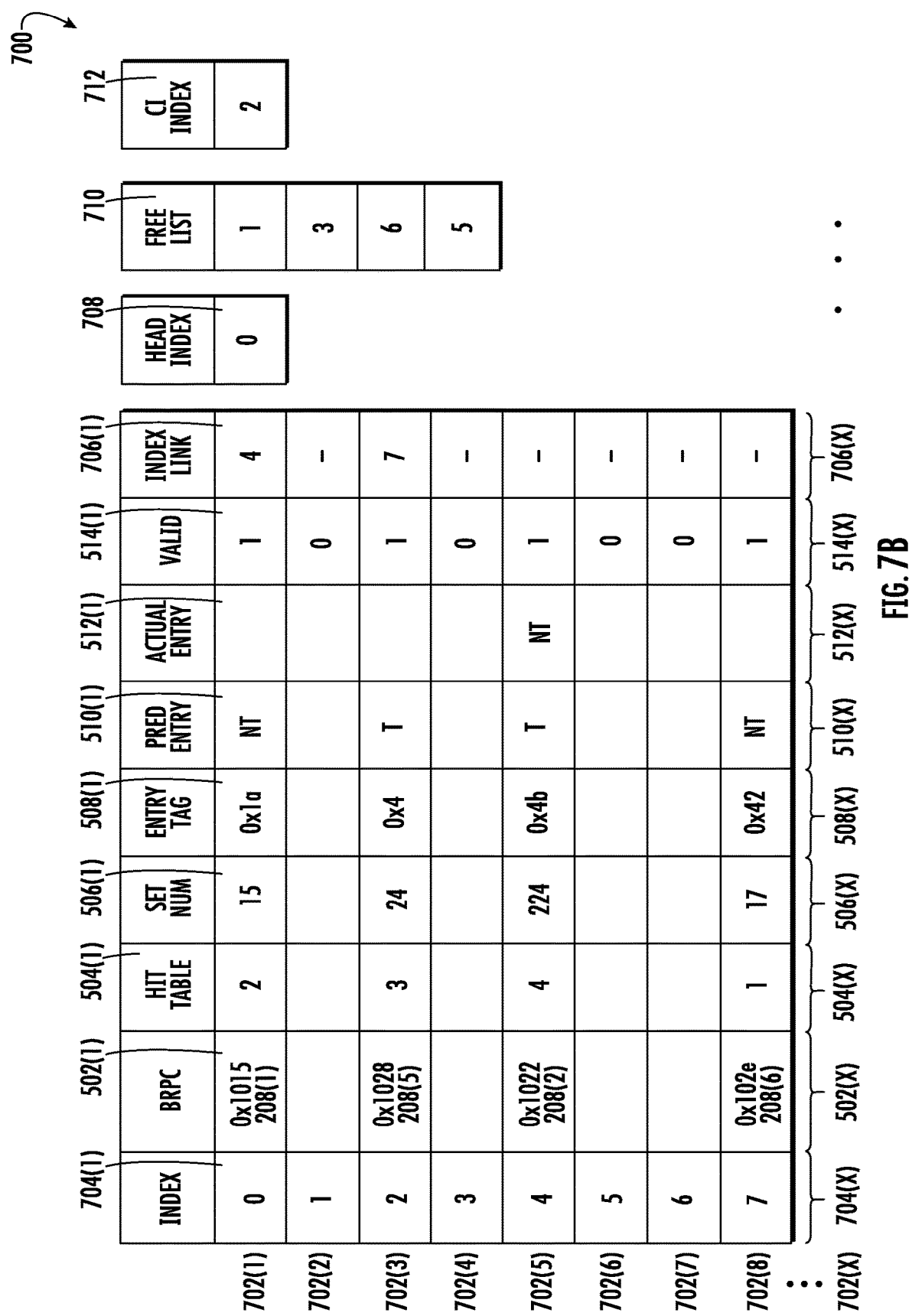
Figure 7C:
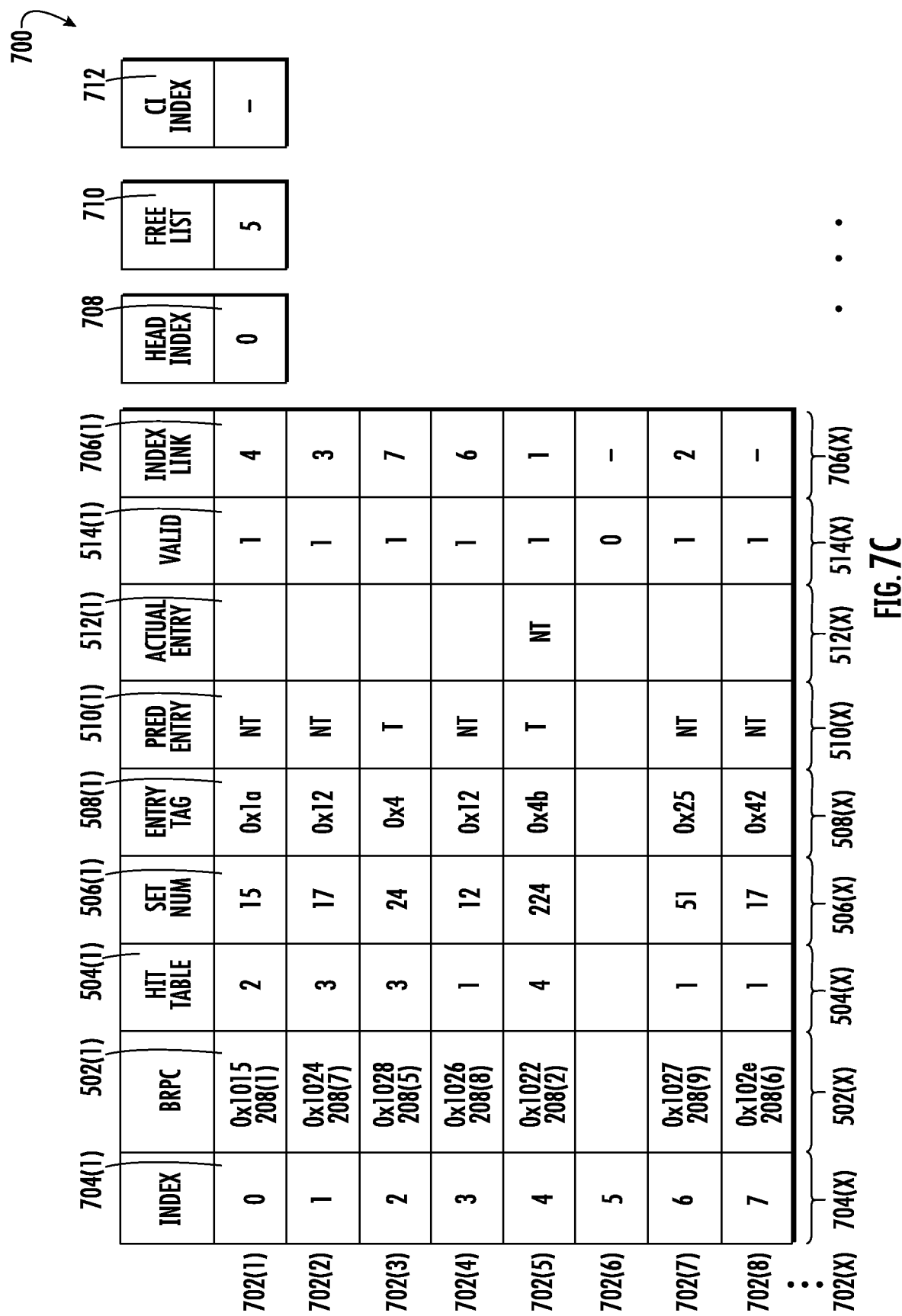
Figure 9:
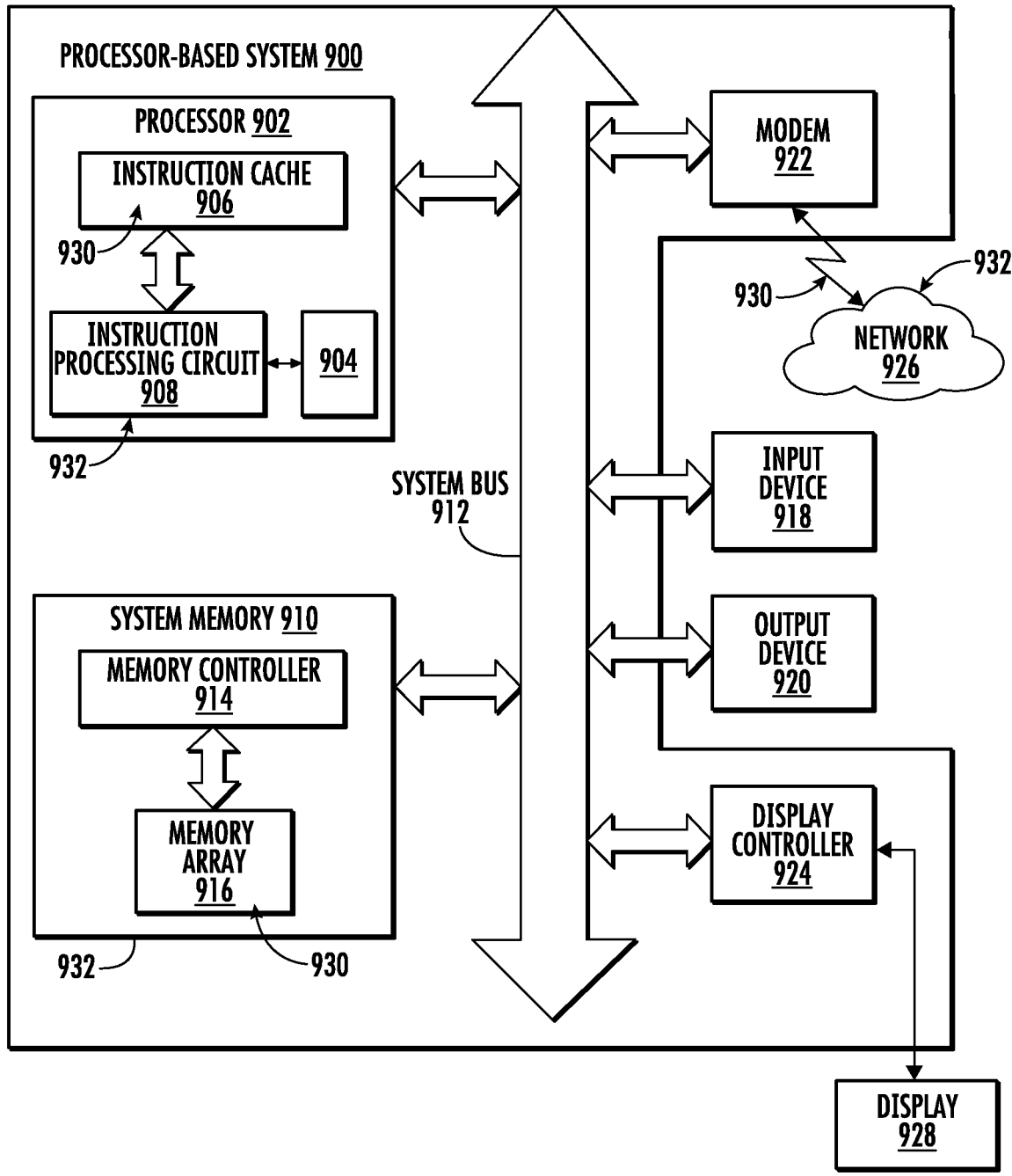

FIG. 7A-7C are diagrams of another exemplary BRB circuit in the processor in FIG. 2 that is configured to be indexed to point to a next conditional control instruction in an instruction stream fetched in an instruction pipeline before and after a flush event and after reconvergence, respectively, to maintain the proper order of conditional control instructions as fetched in an instruction stream into an instruction pipeline;

FIG. 8A is a diagram of the predicted branch recovery trace record in FIG. 3A;

FIG. 8B is a diagram of the actual branch recovery trace record in FIG. 3B;

FIG. 8C is a diagram of the non-speculative history in FIG. 3C;

FIG. 8D is a diagram of an exemplary speculative history based on the a speculative prediction of the conditional control instructions in FIGS. 8A and 8B, before a misprediction recovery used by the speculative prediction circuit in conditional control instructions in FIG. 2 to make speculative predictions, and a restored and correct speculative history resulting from misprediction recovery; and FIG. 9 is a block diagram of an exemplary processor-based system that includes a processor and an instruction processing circuit with one or more instruction pipelines for processing computer instructions for execution, wherein the processor is configured to restore entries of the speculative history associated with younger CI conditional control instructions in misprediction recovery, including, without limitation, the processor in FIG. 2.

DETAILED DESCRIPTION

Exemplary aspects disclosed herein include restoring speculative history used for making speculative predictions for instructions processed in a processor. The processor is configured to speculatively predict a value associated with an operation. For example, the processor can be configured to speculatively predict an outcome of a condition or predicate of a conditional control instruction (e.g., a conditional branch instruction) before its condition is fully evaluated in execution. Predictions are made by a speculative prediction circuit in the processor based on a prediction history that is updated based on outcomes of past predictions. For example, if the outcome of a condition of a conditional control instruction is speculatively predicted and then later determined to have been previously mispredicted in execution, the processor can perform a misprediction recovery by stalling the instruction pipeline, flushing younger instructions in the instruction pipeline back to the mispredicted conditional control instruction, and then re-fetching instructions in the correct instruction flow path for execution. In exemplary aspects disclosed herein, the processor can be configured to restore entries of the speculative history associated with younger control independent (CI) conditional control instructions. By restoring entries of the speculative history associated with younger CI conditional control instructions, younger fetched instructions that follow non-re-fetched CI instructions in misprediction recovery will use a more accurate speculative history that includes restored speculative history information for older non-re-fetched CI instructions.

Before discussing examples of restoring speculative history used for making speculative predictions for instructions processed in a processor starting at FIG. 3A, an exemplary processor 200 in a processor-based system 202 is first discussed below with regard to FIG. 2.

In this regard, FIG. 2 is a diagram of an exemplary processor 200 that is part of a processor-based system 202. The processor 200 may be an in-order or an out-of-order processor (OoP) as non-limiting examples. The processor 200 includes an instruction processing circuit 204 that includes an instruction fetch circuit 206 configured to fetch instructions 208 from an instruction memory 210. The instruction memory 210 may be provided in or as part of a system memory in the processor-based system 202 as an example. The instruction fetch circuit 206 in this example is configured to provide the instructions 208 as fetched instructions 208F into an instruction pipeline IP as an instruction stream 212 in the instruction processing circuit 204 to be decoded in a decode circuit 214 and processed as decoded instructions 208D before being executed in an execution circuit 216. The produced value generated by the execution circuit 216 from executing the decoded instruction 208D is committed (i.e., written back) to a storage location indicated by the destination of the decoded instruction 208D. This storage location could be memory 218 in the processor-based system 202 or a physical register $P_0$-$P_X$ in a physical register file (PRF) 220, as examples.

With continuing reference to FIG. 2, once fetched instructions 208F are decoded into decoded instructions 208D, the decoded instructions 208D are provided to a rename/allocate circuit 222 in the instruction processing circuit 204. The rename/allocate circuit 222 is configured to determine if any register names in the decoded instructions 208D need to be renamed to break any register dependencies that would prevent parallel or out-of-order processing. The rename/allocate circuit 222 is also configured to call upon a register map table (RMT) 224 to rename a logical source register operand and/or write a destination register operand of a decoded instruction 208D to available physical registers $P_0$-$P_X$ in PRF 220. The RMT 224 contains a plurality of mapping entries each mapped to (i.e., associated with) a respective logical register $R_0$-$R_P$. The mapping entries are configured to store information in the form of an address pointer to point to a physical register $P_0$-$P_X$ in the PRF 220. Each physical register $P_0$-$P_X$ in the PRF 220 contains a data entry 226(0)-226(X) configured to store data for the source and/or destination register operand of a decoded instruction 208D.

The processor 200 also includes a speculative prediction circuit 228 that is configured to speculatively predict a value associated with an operation in the processor 200. For example, the speculative prediction circuit 228 may be configured to predict a condition of a conditional control instruction 208, such as a conditional branch instruction, that will govern in which instruction flow path, next instructions 208 are fetched by the instruction fetch circuit 206 for processing. For example, if the conditional control instruction 208 is a conditional branch instruction, the speculative prediction circuit 228 can predict whether a condition of the conditional branch instruction 208 will be later resolved in the execution circuit 216 as either "taken" or "not taken." In this example, the speculative prediction circuit 228 is configured to consult a prediction history indicator 230 to make a speculative prediction. As an example, the prediction history indicator 230 contains a global history of previous predictions. The prediction history indicator 230 is hashed with the program counter (PC) of a current conditional control instruction 208 to be predicted in this example to generate a prediction index into a prediction table circuit 232. The prediction table circuit 232 contains a prediction value (e.g., a counter value) that is mappable to a conditional control instruction 208 based on a prediction index assigned to conditional control instruction 208. As discussed in more detail below, prediction indexes for conditional control instructions 208 can be stored in a branch reorder buffer (BRB) circuit 234. The indexed prediction value in the prediction table circuit 232 is used to generate a current speculative prediction for the conditional control instruction 208. In this manner, predictions of newly fetched conditional control instructions 208F are based on recent and historical resolutions of conditional control instructions in the instruction processing circuit 204. The prediction value will be used to determine whether the instruction fetch circuit 206 fetches next instructions 208 following (i.e., younger than) the conditional branch instruction 208 in the taken instruction flow path or not taken instruction flow path.

If the outcome of a condition of a decoded speculatively predicted conditional control instruction 208D is determined to have been mispredicted in execution, the instruction processing circuit 204 can perform a misprediction recovery. In this regard, in this example, the execution circuit 216 issues a flush event 236 to a commit/flush circuit 238. The commit/flush circuit 238 is configured to stall the instruction pipeline IP and flush instructions 208F, 208D in the instruction pipeline IP in the instruction processing circuit 204 that are younger than the mispredicted conditional control instruction 208. In this regard, the commit/flush circuit 238 is configured to consult with a reorder buffer circuit 240 that stores and maintains the order of fetched instructions 208F into the instruction pipeline IP. The rename/allocate circuit 222 is configured to insert decoded instructions 208D into entries in the reorder buffer circuit 240 as part of the in-order section of the instruction processing circuit 204 before the decoded instructions 208D are scheduled for execution by a scheduler circuit 242. The scheduler circuit 242 can schedule decoded instructions 208D for execution out-of-order based on their dependencies and when their source data is available. In this manner, the reorder buffer circuit 240 can be used by the commit/flush circuit 238 to identify instructions 208 younger than the mispredicted conditional control instruction 208 for flushing. The commit/flush circuit 238 can then direct the instruction fetch circuit 206 to fetch instructions 208 in the instruction pipeline IP from the correct instruction flow path for the conditional control instruction 208 based on the resolved condition.

When a mispredicted conditional control instruction 208 is resolved and a flush event 236 is generated, the instruction processing circuit 204 is also configured to update the prediction history indicator 230 and the BRB circuit 234 as part of prediction training. This is so that the previous updating of the prediction history indicator 230 and the BRB circuit 234 based on the mispredicted conditional control instruction 208 can be reversed in essence so as to not affect future predictions of conditional control instruction 208 including in the correct instruction flow path from the mispredicted conditional control instruction 208 after flushing. In this regard, the prediction history indicator 230 is updated in response to a flush event 236 so that future predictions are based on resolved conditions of the conditional control instructions 208 to improve prediction accuracy. The BRB circuit 234 is also updated in response to a flush event 236, so that the prediction value at the prediction index in the prediction table circuit 232 previously indexed and accessed to predict the mispredicted conditional control instruction 208 is updated (i.e., trained) to record the misprediction. For example, the prediction value at a prediction index in the prediction table circuit 232 may be decremented to indicate a misprediction. The prediction value at a prediction index in the prediction table circuit 232 may be incremented to indicate a correct prediction. In this manner, the prediction value at a prediction index in the prediction table circuit 232 can be used to indicate a prediction (e.g. taken or not taken) as well as a confidence or strength of such prediction for future predictions that access the prediction value at the same prediction index in the prediction table circuit 232.

To further illustrate misprediction recovery for speculatively mispredicted conditional control instructions 208 by the speculative prediction circuit 228 in FIG. 2, FIGS. 3A-3D are provided. FIG. 3A is a diagram of an exemplary predicted branch recovery trace record 300 of fetched conditional control instructions 208F predicted in the instruction processing circuit 204 in FIG. 2. As shown therein, a first conditional control instruction 208(1) fetched by the instruction processing circuit 204 in FIG. 2 is shown as being from branch PC (BRPC) 0x1015. The speculative prediction circuit 228 predicted the condition of this conditional control instruction 208(1) as not taken (NT). In this regard, the speculative prediction circuit 228 uses the prediction history indicator 230 to generate a prediction index into the prediction table circuit 232 in FIG. 2 as discussed above, to make the NT prediction for conditional control instruction 208(1) at BRPC 0x1015. As shown in FIG. 3C, in this example, the prediction history indicator 230 is made up of a non-speculative prediction history indicator 230NS and a speculative prediction history indicator 230S. The non-speculative prediction history indicator 230NS has resolved entries 304 (e.g., bits) that can each store a record of resolved conditions of previously executed conditional control instructions 208 in the instruction processing circuit 204. For example, a '0' bit stored in a resolved entry 304 can indicate NT resolution, and a '1' bit stored in a resolved entry 304 can indicate a taken (T) resolution. The speculative prediction history indicator 230S is also an indicator that has unresolved prediction entries 306 (e.g., bits) that can each store a record of unresolved predictions made for predicted conditional control instructions 208 in the instruction processing circuit 204 that have not yet been executed. Again, as an example, a '0' bit stored in a prediction entry 306 indicates a NT prediction, and a '1' bit stored in a prediction entry 306 indicates a T prediction. Thus, as shown in FIG. 3C, in the speculative prediction history indicator 230S, the recorded bits of '010110' in the unresolved prediction entries 306 indicate a sequential prediction history (left most bit being oldest, and right most bit being youngest), of NT, T, NT, T, T, NT. The recorded bit of '0' in the left most prediction entry 306(1) in the speculative prediction history indicator 230S represents the NT prediction for conditional control instruction 208(1). The speculative prediction history indicator 230S is appended to the non-speculative prediction history indicator 230NS to form the prediction history indicator 230 used by the speculative prediction circuit 228 to make predictions of conditional control instructions 208. In this manner, the prediction history indicator 230 reflects a history of predictions that include both resolved and unresolved predictions.

With continuing reference to FIG. 3A, as a result of the NT prediction of conditional control instruction 208(1), the instruction fetch circuit 206 fetches next, younger instructions 208 in the NT instruction flow path for conditional control instruction 208(1). As shown in the predicted branch recovery trace record 300, conditional control instruction 208(2) at BRPC 0x1022 is the next encountered conditional control instruction in the NT instruction flow path for conditional control instruction 208(1). As shown in FIG. 3A, the condition of the conditional control instruction 208(2) is predicted by the speculative prediction circuit 228 as T based on the speculative prediction history indicator 230. The speculative prediction history indicator 230S has a recorded '0' in prediction entry 306(1) for a NT prediction for the conditional control instruction 208(1) as shown in FIG. 3C. The speculative prediction circuit 228 then records the T prediction as a '1' bit for conditional control instruction 208(2) in the speculative prediction history indicator 230S of the prediction history indicator 230 as shown in FIG. 3C. This is so that future predictions are based on an updated speculative prediction history indicator 230S that includes recorded predictions for conditional control instruction 208(1) and conditional control instruction 208(2). The predicted branch recovery trace record 300 in FIG. 3A shows subsequent younger conditional control instructions 208(3)-208(6) processed by the instruction processing circuit 204 in FIG. 2 and their predictions made by the speculative prediction circuit 228.

FIG. 3B illustrates an actual branch recovery trace record 302 that shows the resolved conditions of the conditional control instruction 208(1)-208(6) based on the execution. As shown in FIG. 3B, the NT prediction for conditional control instruction 208(1) was resolved as correct, but the T prediction for conditional control instruction 208(2) was resolved as being incorrect. The correct resolution of the condition for conditional control instruction 208(2) is NT, and thus the prediction of NT for conditional control instruction 208(2) by the speculative prediction circuit 228 was incorrect. This means that younger conditional control instructions 208(3), 208(4) shown in the predicted branch recovery trace record 300 in FIG. 3A were fetched in error. This is because conditional control instructions 208(3), 208(4) are control dependent (CD) on mispredicted conditional control instruction 208(2). Conditional control instructions 208(5), 208(6) are instructions that are located at the merge point of conditional control instruction 208(2). Thus, conditional control instructions 208(5), 208(6) are CI instructions that are present in both the taken T and not taken NT instruction flow paths from conditional control instruction 208(2) as shown in the predicted and actual branch recovery trace records 300, 302 in FIGS. 3A and 3B, respectively.

In response to the detection of the misprediction of conditional control instruction 208(2), the execution circuit 216 in FIG. 2 issues the flush event 236 to flush conditional control instructions 208(3), 208(4) and to fetch instructions 208 in the correct, NT instruction flow path from conditional control instructions 208(2) in misprediction recovery. The fetched instructions 208F in the correct, NT instruction flow path from conditional control instructions 208(2) are shown in the actual branch recovery trace record 302 as conditional control instructions 208(7)-208(9), 208(5), and 208(6). As discussed above, predictions of newly fetched conditional control instructions 208F are made based on the prediction history indicator 230 that includes the speculative prediction history indicator 230S. Thus, because in this example, the speculative prediction history indicator 230S was updated based on the misprediction of conditional control instruction 208(2), if the speculative prediction history indicator 230S is not also updated in response to a flush event 236 in misprediction recovery, the speculative prediction history indicator 230S will not accurately reflect the prediction history. This is because the prediction for conditional control instruction 208(2) as well as the flushed younger conditional control instructions 208(3), 208(4) would still be present in the speculative prediction history indicator 230S otherwise. The prediction entry 306(2) for conditional control instruction 208(2) in the speculative prediction history indicator 230S would be T (e.g., a '1' bit) instead of NT (e.g., a '0' bit) if the speculative prediction history indicator 230S was not updated in response to a flush event 236 in misprediction recovery. Also, the predictions for conditional control instructions 208(3), 208(4) in the speculative prediction history indicator 230S may be inaccurate, because conditional control instructions 208(3), 208(4) were only fetched due to the misprediction of conditional control instruction 208(2), and are flushed in the instruction pipeline IP in misprediction recovery.

Thus, as shown in FIG. 3D, the instruction processing circuit 204 can be configured to update the speculative prediction history indicator 230S of the prediction history indicator 230 as the updated speculative prediction history indicator 230S-U in response to a flush event 236 in misprediction recovery. FIG. 3D shows an updated speculative prediction history indicator 230S-U that has recorded bits '0000010' (i.e., NT, NT, NT, NT, NT, T, NT) in prediction entries 306(1)-306(7) to reflect updated predictions for conditional control instructions 208(1)-208(2), 208(7)-208(9), 208(5)-208(6), respectively, according to the actual branch recovery trace record 302 in FIG. 3B. Note that the updated prediction entry 306(2) in the updated speculative prediction history indicator 230S-U for conditional control instruction 208(2) is now '0' meaning NT. Newly fetched conditional control instructions 208(7)-208(9) are predicted based on the more accurate, updated speculative prediction history indicator 230S-U instead of the previous speculative prediction history indicator 230S that contains an incorrect prediction for conditional control instruction 208(2) and predictions for conditional control instructions 208(3), 208(4) that were fetched in the incorrect instruction flow path for conditional control instruction 208(2).

The instruction processing circuit 204 in the processor 200 in FIG. 2 can also be configured to employ Control independence techniques to avoid flushing of all CI instructions in misprediction recovery. For example, Control independence techniques can involve the instruction processing circuit 204 in FIG. 2 identifying if a CI instruction 208 is a CI, data independent (DI) (CIDI) instruction 208 or a CI, data dependent (DD) (CIDD) instruction 208 in a CI region of the instruction stream 212 in misprediction recovery. For example, conditional control instructions 208(5), 208(6) are in a CI instruction region 308 for conditional control instruction 208(2) in FIG. 3A. Conditional control instructions 208(3), 208(4) are in a CD instruction region 310 for conditional control instruction 208(2) in FIG. 3A. The instruction processing circuit 204 in FIG. 2 can re-fetch and re-process CIDD instructions 208 that followed a mispredicted conditional control instruction 208 so that its data dependency is resolved correctly based on fetched instructions 208F in the correct instruction flow path. However, CIDI instructions 208 can simply be replayed (i.e., processed in the instruction pipeline IP) following the fetching and processing of older instructions 208 in the correct instruction flow path in misprediction recovery without the need to re-fetch such CIDI instructions. This is because CIDI instructions 208 are neither control, nor data dependent on CD instructions 208 that were fetched from an incorrect instruction flow path and processed following a mispredicted conditional control instruction 208.

However, even with the instruction processing circuit 204 employing Control independence techniques to avoid flushing younger CIDI instructions 208, the prediction history indicator 230 FIG. 3C used to make a speculative prediction of younger CIDI conditional control instructions 208 may have a record of inaccurate predictions. The prediction history indicator 230 will have recorded predictions from younger CD conditional control instructions 208 in the incorrect instruction flow path that were predicted before misprediction recovery, as discussed above. This means that even with misprediction recovery, younger CIDI conditional control instructions 208 that followed a CD conditional control instruction 208 in the incorrect instruction flow path may have been predicted with an incorrect prediction history indicator 230.

Thus, in exemplary aspects disclosed herein, the instruction processing circuit 204 is configured to restore the speculative prediction history indicator 230S to be accurate despite not re-fetching and re-predicting the condition of younger, CIDI conditional control instructions 208 during their replay in misprediction recovery. In this regard, the instruction processing circuit 204 in FIG. 2 can be configured to restore the prediction entries 306 in the speculative prediction history indicator 230S that were recorded based on speculative predictions of younger CIDI conditional control instructions 208. This is so that the previous predictions made for the younger, CIDI conditional control instructions 208 are recorded in prediction entries 306 in the updated speculative prediction history indicator 230S-U as shown in FIG. 3D. In this manner, further younger conditional control instructions following such younger CI conditional control instructions 208 will be predicted based on an accurate prediction history indicator 230 without having to re-fetch and re-predict such younger CI conditional control instructions 208. In this example, younger CIDD conditional control instructions 208 are re-fetched and re-predicted in misprediction recovery, so the re-predictions made for these younger, CIDDD conditional control instructions 208 will be recorded in the updated speculative prediction history indicator 230S-U without restoration, as shown in FIG. 3D. These exemplary techniques are shown by example in FIGS. 3A-3D and the exemplary process 400 in FIG. 4, discussed below.

In this regard, in this example, the instruction fetch circuit 206 of the instruction processing circuit 204 is configured to fetch a conditional control instruction 208 in the instruction stream 212 in the instruction pipeline IP in FIG. 2. Then instruction processing circuit 204 is configured to speculatively predict a condition in a conditional control instruction 208 in the instruction stream 212 in the instruction pipeline IP in FIG. 2 based on the speculative prediction history indicator 230S (block 402 in FIG. 4). An example of this is the fetched conditional control instruction 208(2) at BRPC 0x1022 in FIG. 3A, wherein the condition of conditional control instruction 208(2) is speculatively predicted as T by the speculative prediction circuit 228 in FIG. 2. The speculative prediction circuit 228 is configured to update a prediction entry 306(2) in the speculative prediction history indicator 230S based on the speculative prediction of the condition of the conditional control instruction 208(2).

The instruction fetch circuit 206 is then configured to fetch CD instructions 208 to the conditional control instruction 208 in a first CD instruction region 310 of the conditional control instruction 208 based on the speculative prediction of the conditional control instruction 208. An example of this is shown in FIG. 3A wherein the fetched CD instructions 208F to the conditional control instruction 208 (2) are conditional control CD instructions 208(3), 208(4) in the CD instruction region 310 of the conditional control instruction 208(2). The speculative prediction circuit 228 of the instruction processing circuit 204 is configured to speculatively predict a condition of fetched CD conditional control instructions 208F in the first CD instruction region 310 following the conditional control instruction 208 in the instruction stream 212 (block 404 in FIG. 4). An example of this is shown in FIG. 3A, wherein the condition of CD conditional control instructions 208(3), 208(4) are speculatively predicted as NT and T, respectively, by the speculative prediction circuit 228 in FIG. 2. The speculative prediction circuit 228 is then configured to update the prediction entries 306 of the speculative prediction history based on the respective speculative prediction of the CD conditional control instructions 208 in the first CD instruction region 310. An example of this is shown in FIG. 3C, wherein the prediction entries 306(3), 306(4) in a speculative prediction history indicator 230S of a prediction history indicator 230 are recorded with the predictions of CD conditional control instructions 208(3), 208(4) as NT and T, respectively, by the speculative prediction circuit 228 in FIG. 2. The prediction entries 306(3), 306(4) in the speculative prediction history indicator 230S in FIG. 3C are referred to as CD prediction entries, because prediction entries 306(3), 306(4) are recording predictions of CD conditional control instructions 208 (3), 208(4).

The instruction fetch circuit 206 is configured to fetch one or more CI instructions 208 in a CI instruction region 308 of the conditional control instruction 208. An example of this is shown in FIG. 3A, wherein the fetched CI instructions 208F to the conditional control instruction 208(2) are conditional control CI instructions 208(5), 208(6) in the CI instruction region 308 of the conditional control instruction 208(2). The speculative prediction circuit 228 is then configured to speculatively predict a condition of one or more CI conditional control instructions 208 in a CI instruction region 308 following the first CD instruction region 310 in the instruction stream 212 (block 406 in FIG. 4). An example of this is shown in FIG. 3A, wherein the condition of CI conditional control instructions 208(5), 208(6) are speculatively predicted as T and NT, respectively, by the speculative prediction circuit 228 in FIG. 2. The speculative prediction circuit 228 is then configured to update the CI prediction entries 306 of the speculative prediction history indicator 230S based on the respective speculative prediction of the CI conditional control instructions 208 in the CI instruction region 308 (block 408 in FIG. 4). An example of this is shown in FIG. 3C, wherein the prediction entries 306(5), 306(6) in the speculative prediction history indicator 230S are recorded with the predictions of CI conditional control instructions 208(5), 208(6) as T and NT, respectively, by the speculative prediction circuit 228 in FIG. 2. The prediction entries 306(5), 306(6) in the prediction history indicator 230 in FIG. 3C are referred to as CI prediction entries, because prediction entries 306(5), 306(6) are recording predictions of CI conditional control instructions 208(5), 208(6).

Figure 4:
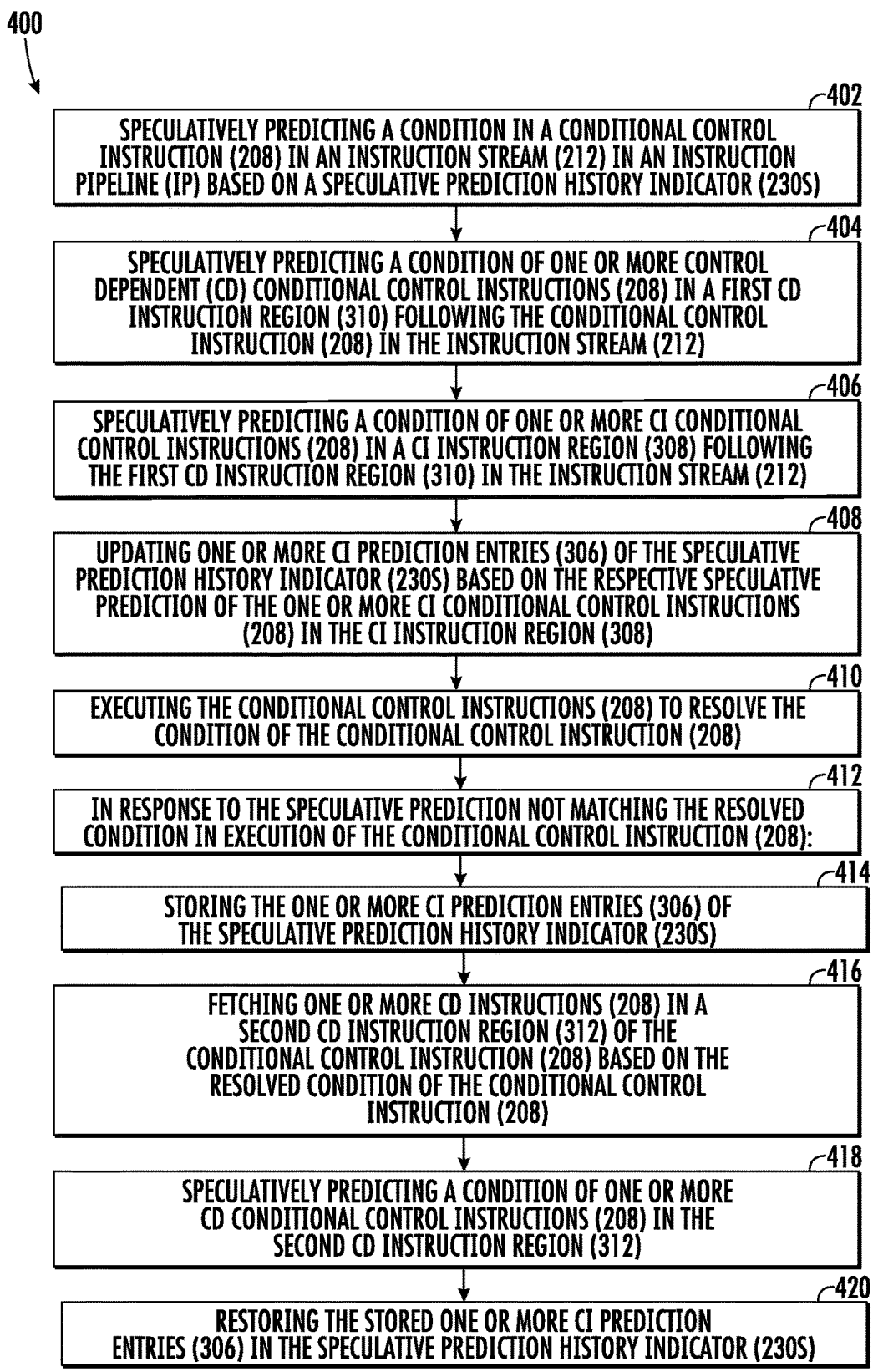
FIG. 4 is a flowchart illustrating an exemplary process of the instruction processing circuit in FIG. 2 restoring entries of the speculative history associated with younger CI conditional control instructions in misprediction recovery.

In this example, the execution circuit 216 in the instruction processing circuit 204 is configured to execute the conditional control instruction 208(2) to resolve the condition of the conditional control instruction 208(2) (block 410 in FIG. 4). The execution circuit 216 resolves the condition of the conditional control instruction 208(2). In this example, the resolved the condition of the conditional control instruction 208(2) is NT as shown in FIG. 3B, but was previously predicted by the speculative prediction circuit 228 as T. Thus, the prediction entry 306(2) in the speculative prediction history indicator 230S was recorded with a prediction of T, indicated by a '1' bit.

In response to the speculative prediction of the conditional control instruction 208(2) not matching the resolved condition of the conditional control instruction 208(2) in execution (block 412 in FIG. 4), the instruction fetch circuit 206 is configured to stall fetching of new instructions 208 into the instruction pipeline IP. The speculative prediction circuit 228 is configured to store the prediction values in the prediction entries 306 associated with CI instructions 208 in the speculative prediction history indicator 230S so that these prediction values can be restored after misprediction recovery (block 414 in FIG. 4). An example of this is shown in FIG. 3D, wherein the prediction values '10' in prediction entries 306(5), 306(6) in the speculative prediction history indicator 230S are stored so that these prediction values can be restored after misprediction recovery. The instruction processing circuit 204 then removes the CD prediction entries 306 in the speculative prediction history indicator 230S since the CD instructions 208 associated with the CD prediction entries 306 will be flushed (block 414 in FIG. 4). An example of this is shown in FIG. 3D, where the speculative prediction history indicator 230S is right shifted by 4 bits to remove all prediction values for prediction entries 306(3)-306(6) for predictions made after the recorded prediction value in prediction entry 306(2) for mispredicted conditional control instruction 208(2) in the speculative prediction history indicator 230S.

The instruction fetch circuit 206 then unstalls and fetches one or more CD instructions 208 in a second CD instruction region 312 in the correct instruction flow path of the conditional control instruction 208(2) based on the resolved condition of the conditional control instruction 208(2) (block 416 in FIG. 4). This is shown by example in FIG. 3B wherein CD conditional control instructions 208(7)-208(9) in a second CD instruction region 312 in the correct instruction flow path of the conditional control instruction 208(2) are fetched. The speculative prediction circuit 228 then speculatively predicts a condition of one or more CD conditional control instructions 208 in the second CD instruction region 312 (block 418 in FIG. 4). This is shown by example in FIG. 3B, where the speculative prediction circuit 228 speculatively predicts condition of CD conditional control instructions 208(7)-208(9) in the second CD instruction region 312 as NT, NT, NT, respectively. The speculative prediction circuit 228 then updates the prediction entries 306(3)-306(5) for the CD conditional control instructions 208(7)-208(9) in the speculative prediction history indicator 230S as shown in the updated speculative prediction history indicator 230S-U. This is shown by example in FIG. 3D, wherein prediction entries 306(3)-306(5) are updated with '0' bits to record a NT prediction for CD conditional control instructions 208(7)-208(9). The speculative prediction circuit 228 is then configured to append the stored CI prediction entries 306 to the speculative prediction history indicator 230S to restore the stored CI prediction entries 306 to the speculative prediction history indicator 230S so that the predictions for the CI conditional control instructions 208 associated with the stored CI prediction entries 306 are restored to provide an accurate prediction history indicator 230 for future, younger predicted conditional control instructions 208 (block 420 in FIG. 4). This is shown by example in FIG. 3D, wherein stored CI prediction entries 306(5), 306(6) are appended to the updated speculative prediction history indicator 230S-U as CI prediction entries 306(6), 306(7). As discussed above, in this example, it is desired to not re-fetch and re-predict CIDI conditional control instructions 208 after misprediction recovery to reduce recovery time.

The instruction processing circuit 204 in FIG. 2 is configured to replay the CI conditional control instructions 208 that are younger than a mispredicted conditional control instruction 208 after misprediction recovery without having to re-fetch these CI conditional control instructions 208. The CI conditional control instructions 208 can be re-processed and executed in the instruction pipeline IP following CD instructions 208 that are fetched in the correct instruction flow path of the conditional control instruction 208 that was mispredicted. For example, the instruction processing circuit 204 may be configured to replay CIDI conditional construction instructions 208 without having to re-fetch such instructions 208 following a mispredicted conditional control instruction 208 in misprediction recovery. The instruction processing circuit 204 may also be configured to re-fetch and speculative re-predict conditions of CIDD conditional construction instructions 208 following a mispredicted conditional control instruction 208 in misprediction recovery due to their data dependency on a CD conditional control instruction(s) 208 in the incorrect instruction flow path. The instruction processing circuit 204 can also fetch and speculatively predict additional younger CI conditional control instructions 208 based on the restored speculative prediction history indicator 230S, and update the CI prediction entries of the speculative prediction history indicator 230S based on the speculative predictions of the younger CI conditional control instructions 208.

To provide further exemplary detail on misprediction recovery in the instruction processing circuit 204 in FIG. 2, FIGS. 5 and 6 are provided. FIGS. 5 and 6 illustrate the states of an exemplary BRB circuit 234 in FIG. 2, before and after misprediction recovery, respectively, according to the predicted and actual branch recovery trace records 300, 302 in FIGS. 3A and 3B. As shown in FIG. 5, the BRB circuit 234 includes a plurality of BRB entries 500(1)-500(X) that are each configured to store information about a conditional control instruction 208 fetched and processed in the instruction pipeline IP. As discussed above, information in the BRB circuit 234 is maintained by the speculative prediction circuit 228. Each BRB entry 500(1)-500(X) includes a respective conditional control instruction identifier 502(1)-502(X) to identify an inserted conditional control instruction 208, which may be BRPC of the conditional control instruction 208. Each BRB entry 500(1)-500(X) also includes a respective hit table indicator 504(1)-504(X), set number indicator 506(1)-506(X), and entry tag 508(1)-508(X) to collectively provide a prediction address pointer providing a prediction index into the prediction table circuit 232 in FIG. 2 to obtain a prediction for the respective conditional control instruction 208 for the BRB entry 500(1)-500(X). As discussed above, a hit table indicator 504(1)-504(X), set number indicator 506(1)-506(X), and entry tag 508(1)-508(X) may be determined by the speculative prediction circuit 228 for a given conditional control instruction 208 based on the prediction history indicator 230 and a hash of the PC of the conditional control instruction 208. The separate hit table indicator 504(1)-504(X), set number indicator 506(1)-506(X), and entry tag 508(1)-508(X) are provided in the BRB entries 500(1)-500(X) in this example, because the prediction table circuit 232 may include multiple prediction table circuits that each have different sets and entries within each set. Thus, the hit table indicator 504(1)-504(X), set number indicator 506(1)-506(X), and entry tag 508(1)-508(X) can be used to identify a specific prediction table circuit 232, set within that specific prediction table circuit 232, and entry within that set in this example.

With continuing reference to FIG. 5, each BRB entry 500(1)-500(X) also includes a respective prediction entry 510(1)-510(X) and actual entry 512(1)-512(X) to store a speculative prediction of a condition for a respective conditional control instruction 208 and to store an actual resolution of the condition of a respective conditional control instruction 208. This information is used by the speculative prediction circuit 228 for handling misprediction recovery in response to a mispredicted conditional control instruction 208. Each BRB entry 500(1)-500(X) also includes a respective valid indicator 514(1)-514(X) indicating if a respective BRB entry 500(1)-500(X) is valid. For example, when a conditional control instruction 208 stored in a BRB entry 500(1)-500(X) is resolved, the BRB entry 500(1)-500(X) may be reused for another processed conditional control instruction 208. The valid indicator 514(1)-514(X) can be set to an invalid state if the respective BRB entry 500(1)-500(X) is not valid at a given time.

As shown in FIG. 5, BRB entries 500(1)-500(6) are filled with information about the conditional control instructions 208(1)-208(6) from FIG. 3A fetched by the instruction processing circuit 204. The speculative prediction of either T or NT is filled in the respective prediction entry 510(1)-510(6) in the BRB entries 500(1)-500(6) as shown in FIG. 3A. As also shown in FIG. 5, when the actual resolved condition for conditional control instruction 208(2) in BRB entry 500(2) is determined to be NT by the execution circuit 216 in FIG. 2, the actual entry 512(2) in the BRB circuit 234 is updated to NT which is different than the predicted condition of T stored in the prediction entry 510(2). This means that conditional control instruction 208(2) was mispredicted by the speculative prediction circuit 228. In response, as shown in FIG. 6, the speculative prediction circuit 228 is configured to flush the BRB entries 500(3), 500(4) for CD conditional control instructions 208(3), 208(4) that followed the mispredicted conditional control instruction 208(2) in the BRB circuit 234. The conditional control instructions 208 that are fetched in the correct instruction flow path are CD conditional control instructions 208(7)-208(9) as shown in the BRB circuit 234 and as previously discussed in the example in FIG. 3B. As shown in FIG. 3B, the flushing of BRB entries 500(3), 500(4) leaves room for only two (2) BRB entries 500 to store new conditional control instructions 208 fetched from the correct instruction flow path of the conditional control instruction 208(2) in misprediction recovery. However, in this example, three (3) new CD conditional control instructions 208(7)-208(9) are fetched in misprediction recovery. BRB entry 500(7) is available to store CD conditional control instruction 208(9) as shown in FIG. 6, but out of order. CD conditional control instruction 208(9) is older than CI conditional control instructions 208(5), 208(6). The conditional control instructions 208 need to be stored in order in the BRB circuit 234 so that the speculative prediction history indicator 230S is restored properly in misprediction recovery. The speculative prediction circuit 228 is configured to update the speculative prediction history indicator 230S based on the order of conditional control instructions 208 in the BRB circuit 234. To alleviate this issue, the additional processing would have to be employed to reorder the BRB entries 500(5)-500(7) in the BRB circuit 234 in an undesired manner.

To reduce the need to order BRB entries 500(1)-500(X) in the BRB circuit 234, as shown in the example in FIG. 6, an alternative BRB circuit 700 that can be the BRB circuit 234 is provided and shown in FIG. 7A. As discussed below, the BRB circuit 700 facilitates a linked list structure to allow BRB entries to be used and flushed without having to reorder the BRB entries. The instruction processing circuit 204 is configured to use the features of the BRB circuit 700 to avoid having to reorder branch entries in the BRB circuit 700. The BRB circuit 700 is shown using the example conditional control instructions 208(1)-208(6) in FIG. 3A and before a flush event occurs due to the misprediction of conditional control instruction 208(2). In this regard, the BRB circuit 700 includes a plurality of BRB entries 702(1)-702(X) similar to the BRB entries 500(1)-500(X) in the BRB circuit 234 in FIGS. 5 and 6. However, the BRB entries 702(1)-702(X) in the BRB circuit 700 also include a respective index indicator 704(1)-704(X), and an index link indicator 706(1)-706(X). The BRB circuit 700 also includes a head index indicator 708. The head index indicator 708 is configured to store an index of the BRB entry 702(1)-702(X) that identifies the first or head, and youngest conditional control instruction 208 in the BRB circuit 700. In this example, the youngest conditional control instruction 208 is conditional control instruction 208(1) in BRB entry 702(1) having an index in its index indicator 704(1) of '0'. Thus, the head index indicator 708 stores an index of '0' in this example. The index link indicator 706(1)-706(X) stores an index pointing to a next BRB entry 500(1)-500(X) that contains the next youngest conditional control instruction 208. Thus, because conditional control instruction 208(2) is the next youngest conditional control instruction after conditional control instruction 208(1), the index link indicator 706(1) stores an index of '4.' This is because BRB entry 702(5) having an index of '4' stores the conditional control instruction 208(2). The index link indicator 706(5) stores an index of '6' pointing to a BRB entry 500(7) that contains the next youngest conditional control instruction 208(3), and so on. The free list 710 store a list of indexes pointing to BRB entries 702(1)-702(X) that are free to be used to store new conditional control instructions 208. A CI index indicator 712 is provided in the BRB circuit 700 to indicate the index of the BRB entry 702(1)-702(X) that stores the next conditional control instruction 208 following a merge or convergency point.

FIG. 7B illustrates the BRB circuit 700 in FIG. 7A after a flush event 236 occurs in misprediction recovery when the CD conditional control instructions 208(3), 208(4) are removed as being in the incorrect instruction flow path. As shown in FIG. 7B, BRB entries 702(6), 702(7) are removed that stored information for CD conditional control instructions 208(3), 208(4) that were flushed as a result of the misprediction of conditional control instruction 208(2). Indexes '5' and '6' corresponding to BRB entries 702(6), 702(7) are put back in the free list 710 to signify that BRB entries 702(6), 702(7) at indexes '5' and '6' are free to store information for new fetched conditional control instructions 208F. The CI index in the CI index indicator 712 is updated to a value of '2' in this example to point to BRB entry 702(3) having an index of '2' for its index indicator 704(3) to identify the first conditional control instruction 208(5) following the merge or convergence point for mispredicted conditional control instruction 208(2).

Then, FIG. 7C illustrates the BRB circuit 700 in FIG. 7A after reconvergence when CD conditional control instructions 208(7)-208(9) are fetched in the correct instruction flow path for conditional control instruction 208(2). As shown in FIG. 7C, BRB entries 702(2), 702(4), 702(7) with indexes of '1', '3' and '6' identified by the free list 710 in FIG. 7B can be used to store information for CD conditional control instructions 208(7)-208(9) fetched from the correct instruction flow path for conditional control instruction 208(2). In this regard, the index link indicator 706(5) for conditional control instruction 208(2) in BRB entry 702(6) has an index of '1' to point to BRB entry 702(2) which stores information about the next conditional control instruction 208(7) following conditional control instruction 208(2). The index link indicator 706(2) for conditional control instruction 208(7) in BRB entry 702(2) has an index of '3' to point to BRB entry 702(4) which stores information about the next conditional control instruction 208(8) following conditional control instruction 208(7). The index link indicator 706(4) for conditional control instruction 208(8) in BRB entry 702(4) has an index of '6' to point to BRB entry 702(7) which stores information about the next conditional control instruction 208(9) following conditional control instruction 208(8). The index link indicator 706(7) for conditional control instruction 208(9) in BRB entry 702(4) has an index of '2' to point to BRB entry 702(3) which stores information about the next conditional control instruction 208(5) following conditional control instruction 208(9), and so on.

As discussed above with regard to FIGS. 3C and 3D, the instruction processing circuit 204 and/or its speculative prediction circuit 228 can be configured to restore CI prediction entries 306 indicating speculative predictions for CI conditional control instructions 208 in the speculative prediction history indicator 230S in the processor 200 in misprediction recovery. This is so that younger conditional control instructions 208 will be predicted based on a more accurate prediction history indicator 230. However, these stored CI prediction entries 306 were previously determined and set based on a speculative prediction history indicator 230S that existed at the time the corresponding CI conditional control instructions 208 were fetched and processed by the speculative prediction circuit 228. This means that any older CD conditional control instructions 208 in a predicted instruction flow path that were also speculatively predicted affected the speculative prediction history indicator 230S used to make speculative predictions about the younger CI conditional control instructions 208. However, these older CD conditional control instructions 208 may have been in an incorrectly fetched instruction flow path from an older conditional control instruction 208 that is later determined in the execution circuit 216 to have been mispredicted. In this instance, the stored and restored CI prediction entries 306 for corresponding CI conditional control instructions 208 was based on predictions for older CD conditional control instructions 208 that will be flushed in misprediction recovery. Thus, the restored CI prediction entries 306 in the speculative prediction history indicator 230S may not indicate the same predictions as they would if the CI prediction entries 306 were based on speculative predictions from a speculative prediction history indicator 230S influenced by older CD conditional control instructions 208 in the correct instruction flow path.

Thus, in other exemplary aspects, in addition to restoring the speculative prediction history indicator 230S corresponding to younger CI conditional control instructions 208, the instruction processing circuit 204 can also be configured to correct prediction values in the prediction table circuit 232 associated with younger CI conditional control instructions 208 in misprediction recovery. In misprediction recovery, the instruction processing circuit 204 can be configured to speculatively re-predict the conditions of younger CI conditional control instructions 208 that are not flushed based on the speculative prediction history indicator 230S that is updated based on fetched CD conditional control instructions 208 in the correct instruction flow path. By correcting the prediction values in the prediction table circuit 232 associated with younger CI conditional control instructions 208 in misprediction recovery, a more accurate prediction can be made for future instances of the CI conditional control instructions 208.

Thus, in another example, to provide a more accurate prediction history for CI conditional control instructions 208, the instruction processing circuit 204 is also configured to update the prediction address pointer in the BRB circuit 234 defined by the respective hit table indicator 504(0)-504(X), set number indicator 506(0)-506(X), and entry tag 508(0)-508(X) in misprediction recovery. For example, the prediction address pointer in the BRB circuit 234 for CI conditional control instructions 208(5), 208(6) in FIG. 6 can be updated in misprediction recovery. The prediction address pointer in the BRB circuit 234 is updated for the CI conditional control instructions 208(5), 208(6) based on the non-speculative prediction history indicator 230NS at the time of execution or commitment of the produced values generated by execution of CI conditional control instructions 208(5), 208(6) in the execution circuit 216 in FIG. 2. This allows the non-speculative prediction history indicator 230NS to be used to update the prediction address pointer in the BRB circuit 234 for the CI conditional control instructions 208(5), 208(6), because the CI conditional control instructions 208(5), 208(6) will have been executed and committed such that CI prediction entries 306 with their predictions are no longer in the speculative prediction history indicator 230S.

Then, the speculative prediction circuit 228 is configured to compare the prediction value in the prediction table circuit 232 at the updated prediction address pointer in the BRB circuit 234 for the CI conditional control instructions 208(5), 208(6) set in CI prediction entries 306(5), 306(6) to the resolved conditions CI conditional control instructions 208(5), 208(6). If the prediction value in the prediction table circuit 232 at the updated prediction address pointer in the BRB circuit 234 matches an actual resolved condition of a CI conditional control instructions 208(5), 208(6), the prediction value in the prediction table circuit 232 at the updated prediction address pointer in the BRB circuit 234 for the CI conditional control instruction 208(5), 208(6) remains unchanged. If however, the prediction value in the prediction table circuit 232 at the updated prediction address pointer in the BRB circuit 234 matches an actual resolved condition of a CI conditional control instructions 208(5), 208(6), the prediction value in the prediction table circuit 232 at the updated prediction address pointer in the BRB circuit 234 for the CI conditional control instruction 208(5), 208(6) remains unchanged. This can provide for a correction to the prediction value in the prediction table circuit 232 even if the CI prediction entries 306(5), 306(6) for the CI conditional control instructions 208(5), 208(6) is inaccurate based on the updating of the speculative prediction history indicator 230S when older CD conditional control instructions 208 are fetched and predicted after misprediction recovery.

In this regard, FIGS. 8A-8D are provided to illustrate an example of correct CI prediction entries 306 associated with younger CI conditional control instructions 208 in misprediction recovery. FIG. 8A is a diagram of an exemplary predicted branch recovery trace record 300 of fetched conditional control instructions 208F predicted in the instruction processing circuit 204 in FIG. 3A. FIG. 8B is a diagram of an exemplary actual branch recovery trace record 302 of fetched conditional control instructions 208F predicted in the instruction processing circuit 204 in FIG. 3B. FIG. 8C illustrates the prediction history indicator 230 which includes the non-speculative prediction history indicator 230NS and the speculative prediction history indicator 230S shown in FIG. 3C. The previous description of FIGS. 3A-3C above are applicable to FIGS. 8A-8C and thus FIGS. 8A-8C need not be re-described.

As shown in FIG. 8D, the instruction processing circuit 204 is configured to update the speculative prediction history indicator 230S of the prediction history indicator 230 in response to a flush event 236 in misprediction recovery. Instead of storing and restoring the previous predictions of T and NT (i.e. '10') in CI prediction entries 306(5), 306(6) in the speculative prediction history indicator 230S associated with CI conditional control instructions 208(5), 208(6), the instruction processing circuit 204 is configured to restore corrected predictions associated with CI conditional control instructions 208(5), 208(6) in the updated speculative prediction history indicator 230S—U based on the fetching and speculative predictions of the conditional control instructions 208(7)-208(9) in the correct instruction flow path for conditional control instruction 208(2) after misprediction recovery. In this example, the speculative prediction of conditional control instructions 208(7)-208(9) as NT, NT, NT (i.e. '000') affected the updated speculative prediction history indicator 230S-U. The speculative predictions of the CI conditional control instructions 208(5), 208(6), based on the updated speculative prediction history indicator 230S-U in response to predicting conditional control instructions 208(7)-208(9) in the correct instruction flow path, resulted in respective predictions T, T (i.e., '11'). These corrected predictions are provided in corrected CI prediction entries 806(5), 806(6) that are appended to the prediction entries in the updated speculative prediction history indicator 230S-U as shown in FIG. 3D.

This, in an example, the speculative prediction circuit 228 in FIG. 2 is configured to speculatively predict a condition of CI conditional control instructions 208(5), 208(6) in the CI instruction region 308 in FIGS. 8A and 8B in misprediction recovery. The prediction conditions form CI prediction entries 806(5), 806(6) as shown in FIG. 8D. The speculative prediction circuit 228 is then configured to update the speculative prediction history indicator 230S in the updated speculative prediction history indicator 230S-U with the CI prediction entries 806(5), 806(6) to provide corrected CI prediction entries 306(6), 306(7) in the updated speculative prediction history indicator 230S-U. The instruction processing circuit 204 and/or its speculative prediction circuit 228 in FIG. 2 is configured to provide corrected CI prediction entries 806(6), 806(7) in the updated speculative prediction history indicator 230S-U by re-predicting the conditions of the CI conditional control instructions 208(5), 208(6) after the BRB circuit 234 is flushed and the CD conditional control instructions 208(7)-208(9) are fetched in the correct instruction flow path. Thus, the updated predictions for the CI conditional control instructions 208(5), 208(6) will be made based on an updated speculative prediction history indicator 230S-U that includes updated predictions in CD prediction entries 306(3)-306(5) in FIG. 8D for the CD conditional control instructions 208(7)-208(9).

In one example, unresolved CI conditional control instructions 208 are processed based on the updated speculative prediction history indicator 230S-U for enhanced accuracy. The instruction processing circuit 204 is configured to determine if re-prediction for the unresolved CI conditional control instructions 208 in CI prediction entries 806(5), 806(6) is different from its initial prediction in CI prediction entries 306(5)-306(6) in the speculative prediction history indicator 230S in FIG. 8C. If the re-prediction for the unresolved CI conditional control instructions 208 in CI prediction entries 806(5), 806(6) is different from its initial prediction in CI prediction entries 306(5), 306(6) in the speculative prediction history indicator 230S, the instruction processing circuit 204 is configured to also override the maintenance of the BRB circuit 234. The corresponding unresolved CI conditional control instruction 208 whose CI prediction entry 306 does not match its re-prediction is flushed from the BRB circuit 234, and the unresolved CI conditional control instructions 208 are re-fetched and processed. In this manner, the re-fetched unresolved CI conditional control instructions 208 is predicted again based on the updated speculative prediction history indicator 230S-U that includes updated predictions in CD prediction entries 306(3)-306(5) in FIG. 8D for the CD conditional control instructions 208(7)-208(9). The updated prediction address pointer in the BRB circuit 234 is defined by the respective hit table indicator 504(0)-504(X), set number indicator 506(0)-506(X), and entry tag 508(0)-508(X), and prediction value in the prediction entry 510(1)-510(X) for the respective unresolved CI conditional control instruction 208 in the BRB circuit 234 is updated to prevent incorrect prediction value updates in the prediction table circuit 232 at the previous prediction address pointer in the BRB circuit 234 for unresolved CI conditional control instruction 208.

This technique of re-predicting all unresolved CI conditional control instruction 208 may delay the fetching and processing of new younger instructions 208 by the instruction processing circuit 204. However, the processing time savings from improved accuracy of the prediction and reduced misprediction recovery may outweigh this additional delay.

In another example, instead of re-predicting all unresolved CI conditional control instruction 208 and delaying the fetching of new, younger instructions 208, the instruction processing circuit 204 may be configured to continue fetching of new, younger instructions 208. A separate circuit in the instruction processing circuit 204, such as the speculative prediction circuit 228 can in a separate process determine updated prediction address pointer in the BRB circuit 234 defined by the respective hit table indicator 504(0)-504(X), set number indicator 506(0)-506(X), and entry tag 508(0)-508(X) for the unresolved CI conditional control instruction 208 as previously discussed above. Then, the instruction processing circuit 204 can be configured to re-predict unresolved CI conditional control instruction 208 after misprediction recovery as discussed above to determine if re-prediction for the unresolved CI conditional control instructions 208 in CI prediction entries 806(5), 806(6) is different from its initial prediction in CI prediction entries 306(5), 306(6) in the speculative prediction history indicator 230S in FIG. 8C. If the re-prediction for the unresolved CI conditional control instructions 208 in CI prediction entries 806(5), 806(6) is different from its initial prediction in CI prediction entries 306(5), 306(6) in the speculative prediction history indicator 230S, the instruction processing circuit 204 is configured to also override the maintenance of the BRB circuit 234 as discussed above.

FIG. 9 is a block diagram of an exemplary processor-based system 900 that includes a processor 902 configured to restore the speculative history in misprediction recovery associated with younger CI conditional control instructions 208 to provide for an accurate speculative history for making speculative predictions while avoiding the need to re-fetch the younger CI conditional control instructions. For example, the processor 902 may be configured to employ Control independence techniques to avoid the need to re-fetch CIDI instructions in misprediction recovery. The processor 902 can restore the previous predictions made for the CI conditional control instructions 208 before a misprediction of an older conditional control instruction, so that the speculative prediction history indicator 230S accurately reflects the prediction history of the CI conditional control instructions. The processor 902 can include, without limitation, the processor 200 in FIG. 2 and any of the functionality for restoring the speculative history in misprediction recovery associated with younger CI conditional control instructions to provide for an accurate speculative history for making speculative predictions described in FIGS. 2-8.

The processor-based system 900 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based system 900 includes the processor 902. The processor 902 represents one or more general-purpose processing circuits, such as a microprocessor, central processing unit, or the like. The processor 902 is configured to execute processing logic in computer instructions for performing the operations and steps discussed herein. In this example, the processor 902 includes a speculative prediction circuit 904 for making speculative predictions of fetched conditional control instructions. The speculative prediction circuit 904 could be the speculative prediction circuit 228 in FIG. 2. The processor 902 also includes an instruction cache 906 for temporary, fast access memory storage of instructions and an instruction processing circuit 908. Fetched or prefetched instructions from a memory, such as from a system memory 910 over a system bus 912, are stored in the instruction cache 906. The instruction processing circuit 908 is configured to process instructions fetched into the instruction cache 906 and process the instructions for execution. The instruction processing circuit 908 is configured to insert the fetched instructions into one or more instruction pipelines that are then processed to execution.

The processor 902 and the system memory 910 are coupled to the system bus 912 and can intercouple peripheral devices included in the processor-based system 900. As is well known, the processor 902 communicates with these other devices by exchanging address, control, and data information over the system bus 912. For example, the processor 902 can communicate bus transaction requests to a memory controller 914 in the system memory 910 as an example of a slave device. Although not illustrated in FIG. 9, multiple system buses 912 could be provided, wherein each system bus constitutes a different fabric. In this example, the memory controller 914 is configured to provide memory access requests to a memory array 916 in the system memory 910. The memory array 916 is comprised of an array of storage bit cells for storing data. The system memory 910 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 912. As illustrated in FIG. 9, these devices can include the system memory 910, one or more input device(s) 918, one or more output device(s) 920, a modem 922, and one or more display controllers 924, as examples. The input device(s) 918 can include any type of input device, including but not limited to input keys, switches, voice processors, etc. The output device(s) 920 can include any type of output device, including but not limited to audio, video, other visual indicators, etc. The modem 922 can be any device configured to allow exchange of data to and from a network 926. The network 926 can be any type of network, including but not limited to a wired or wireless network, a private or public network, a local area network (LAN), a wireless local area network (WLAN), a wide area network (WAN), a BLUETOOTH™ network, and the Internet. The modem 922 can be configured to support any type of communications protocol desired. The processor 902 may also be configured to access the display controller(s) 924 over the system bus 912 to control information sent to one or more displays 928. The display(s) 928 can include any type of display, including but not limited to a cathode ray tube (CRT), a liquid crystal display (LCD), a plasma display, etc.

The processor-based system 900 in FIG. 9 may include a set of instructions 930 that may include conditional control instructions that cause such instructions to either be CI instructions or CD instructions. The instructions 930 may be stored in the system memory 910, processor 902, and/or instruction cache 906 as examples of non-transitory computer-readable medium 932. The instructions 930 may also reside, completely or at least partially, within the system memory 910 and/or within the processor 902 during their execution. The instructions 930 may further be transmitted or received over the network 926 via the modem 922, such that the network 926 includes the non-transitory computer-readable medium 932.

While the non-transitory computer-readable medium 932 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory (RAM), a magnetic disk storage medium, an optical storage medium, flash memory devices, etc.) and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories, registers, or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium, and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be referenced throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A processor, comprising:
   an instruction processing circuit comprising one or more instruction pipelines; and
   a first speculative prediction history indicator;
   the instruction processing circuit configured to:
      speculatively predict a condition in a first conditional control instruction in an instruction stream in a first instruction pipeline among the one or more instruction pipelines based on the first speculative prediction history indicator;

speculatively predict a condition of one or more first control dependent (CD) conditional control instructions in a first CD instruction region following the first conditional control instruction in the instruction stream;
speculatively predict a condition of one or more first control independent (CI) conditional control instructions in a CI instruction region following the first CD instruction region in the instruction stream;
update one or more first CI prediction entries of the first speculative prediction history indicator based on the respective speculative prediction of the one or more first CI conditional control instructions in the CI instruction region;
execute the first conditional control instruction to resolve the condition of the first conditional control instruction; and
in response to the speculative prediction of the first conditional control instruction not matching the resolved condition in execution of the first conditional control instruction:
store the one or more first CI prediction entries of the first speculative prediction history indicator;
fetch one or more second CD conditional control instructions in a second CD instruction region based on the resolved condition of the first conditional control instruction;
speculatively predict a condition of the one or more second CD conditional control instructions in the second CD instruction region; and
restore the stored one or more first CI prediction entries in the first speculative prediction history indicator.

2. The processor of claim 1, wherein the instruction processing circuit is further configured to:
fetch a plurality of instructions from a memory into the first instruction pipeline among the one or more instruction pipelines;
update a first prediction entry in the first speculative prediction history indicator based on the speculative prediction of the condition of the first conditional control instruction;
fetch the one or more first CD conditional control instructions of the plurality of instructions in the first CD instruction region of the first conditional control instruction based on the speculative prediction of the first conditional control instruction;
update one or more CD prediction entries of the first speculative prediction history indicator based on the respective speculative prediction of the one or more first CD conditional control instructions in the first CD instruction region;
fetch one or more CI instructions in the CI instruction region of the first conditional control instruction; and
in response to the speculative prediction of the first conditional control instruction not matching the resolved condition of the first conditional control instruction in execution of the first conditional control instruction:
update the first prediction entry in the first speculative prediction history indicator based on the resolved condition of the first conditional control instruction;
remove the one or more CD prediction entries of the first speculative prediction history indicator;
speculatively predict a condition of one or more second CD conditional control instructions in the second CD instruction region; and
update the one or more CD prediction entries of the first speculative prediction history indicator based on the respective speculative prediction of the one or more second CD conditional control instructions in the second CD instruction region.

3. The processor of claim 1, wherein, in response to the speculative prediction of the first conditional control instruction not matching the resolved condition in execution of the first conditional control instruction, the instruction processing circuit is further configured to:
stall fetching of next instructions into the first instruction pipeline until the one or more first CI prediction entries of the first speculative prediction history indicator are restored.

4. The processor of claim 1, wherein:
the instruction processing circuit is further configured to:
update one or more CD prediction entries of the first speculative prediction history indicator based on the respective speculative prediction of the one or more first CD conditional control instructions in the first CD instruction region; and
the instruction processing circuit is configured to restore the stored one or more first CI prediction entries of the first speculative prediction history indicator after the one or more CD prediction entries of the first speculative prediction history indicator are updated based on the respective speculative prediction of the one or more second CD conditional control instructions in the second CD instruction region.

5. The processor of claim 4, wherein the instruction processing circuit is configured to remove the one or more CD prediction entries of the first speculative prediction history indicator by being configured to:
shift the one or more CD prediction entries in the first speculative prediction history indicator by the number of the one or more CD prediction entries to shift out the one or more CD prediction entries in the first speculative prediction history indicator.

6. The processor of claim 1, wherein the instruction processing circuit is configured to restore the stored one or more first CI prediction entries in the first speculative prediction history indicator by being configured to append the stored one or more first CI prediction entries in the first speculative prediction history indicator.

7. The processor of claim 1, wherein, in response to the restore of the stored one or more first CI prediction entries in the first speculative prediction history indicator, the instruction processing circuit is further configured to:
speculatively predict a condition of one or more younger CI conditional control instructions based on the first speculative prediction history indicator; and
update the one or more first CI prediction entries of the first speculative prediction history indicator based on the respective speculative prediction of the one or more first CI conditional control instructions based on the first speculative prediction history indicator.

8. The processor of claim 1, wherein, in response to the restore of the stored one or more first CI prediction entries of the first speculative prediction history indicator, the instruction processing circuit is further configured to:
process the one or more first CI conditional control instructions based on the first speculative prediction history indicator with the restored one or more first CI prediction entries.

9. The processor of claim 8, wherein the instruction processing circuit is configured to process the one or more first CI conditional control instructions based on the first speculative prediction history indicator with the restored one or more first CI prediction entries without having to re-fetch the one or more first CI conditional control instructions.

10. The processor of claim 8, wherein the instruction processing circuit is configured to process the one or more first CI conditional control instructions comprising one or more CI, data independent (DI) (CIDI) conditional control instructions, which are data dependent on the one or more first CD conditional control instructions in the first CD instruction region, based on the first speculative prediction history indicator with the restored one or more first CI prediction entries, without having to re-fetch the one or more CIDI conditional control instructions.

11. The processor of claim 1, the instruction processing circuit is further configured to:
    execute the one or more first CI conditional control instructions based on the first speculative prediction history indicator with the restored one or more first CI prediction entries.

12. The processor of claim 1, wherein, in response to the restore of the stored one or more first CI prediction entries of the first speculative prediction history indicator, the instruction processing circuit is further configured to:
    re-fetch the one or more first CI conditional control instructions comprising one or more CI, data dependent (DD) (CIDD) conditional control instructions.

13. The processor of claim 1, further comprising:
    a branch reorder buffer (BRB) circuit, comprising a plurality of branch entries each comprising a conditional control instruction identifier configured to store an identifier of a conditional control instruction, a prediction address pointer generated based on the first speculative prediction history indicator, and a prediction entry configured to store a prediction indicator for a conditional control instruction; and
    the instruction processing circuit configured to:
        store a first conditional control instruction identifier for the first conditional control instruction in a first branch entry among the plurality of branch entries in the BRB circuit;
        speculatively predict the condition in the first conditional control instruction in the instruction stream based on a prediction value in a prediction table circuit addressable by the prediction address pointer in the first branch entry;
        store one or more second conditional control instruction identifiers each in the prediction entry in one or more second branch entries among the plurality of branch entries in the BRB circuit, wherein the one or more first second conditional control instruction identifiers identify the respective one or more first CD conditional control instructions in the first CD instruction region;
        store the speculative prediction of the one or more first CD conditional control instructions as the respective prediction indicator in the prediction entry of the one or more second branch entries;
        store one or more third conditional control instruction identifiers in the prediction entry in one or more third branch entries among the plurality of branch entries in the BRB circuit, wherein the one or more third conditional control instruction identifiers identify the respective one or more first CI conditional control instructions in the CI instruction region; and
        store the speculative prediction of the one or more first CI conditional control instructions as the respective prediction indicator in the prediction entry of the one or more third branch entries.

14. The processor of claim 13, further comprising, in response to the speculative prediction of the first conditional control instruction not matching the resolved condition in execution of the first conditional control instruction, the instruction processing circuit further configured to:
    remove the one or more second conditional control instruction identifiers in the prediction entry in the one or more second branch entries; and
    store one or more fourth conditional control instruction identifiers in the prediction entry in one or more fourth branch entries among the plurality of branch entries in the BRB circuit, wherein the one or more fourth conditional control instruction identifiers identify the respective one or more second CD conditional control instructions in the second CD instruction region.

15. The processor of claim 14, wherein each branch entry among the plurality of branch entries in the BRB circuit further comprises an index link indicator configured to store an index link to a next branch entry among the plurality of branch entries; and
    further comprising, in response to the speculative prediction of the first conditional control instruction not matching the resolved condition in execution of the first conditional control instruction, the instruction processing circuit further configured to:
        store an index link in the index link indicator for each branch entry among the plurality of branch entries in the BRB circuit, wherein the index link identifies the respective one or more second CD conditional control instructions in the second CD instruction region, to a next branch entry among the plurality of branch entries in the BRB circuit for a next CD conditional control instruction in the one or more second CD conditional control instructions in the second CD instruction region.

16. The processor of claim 1, wherein, in response to restoring the stored one or more first CI prediction entries of the first speculative prediction history indicator, the instruction processing circuit is further configured to:
    speculatively re-predict the condition of the one or more first CI conditional control instructions in the CI instruction region; and
    update the one or more first CI prediction entries of the first speculative prediction history indicator based on the respective speculative re-prediction of the one or more first CI conditional control instructions.

17. The processor of claim 16, wherein the instruction processing circuit is configured to speculatively predict the condition of each of the one or more first CI conditional control instructions based on a prediction value in a prediction table circuit at a prediction address pointer determined based on the first speculative prediction history indicator;
    the instruction processing circuit further configured to:
        update the prediction address pointer for each of the one or more first CI conditional control instructions based on a first non-speculative prediction history indicator in response to execution of the one or more first CI conditional control instructions;
        generate an actual resolved condition for each of the one or more first CI conditional control instructions based on execution of the one or more first CI conditional control instructions;
        compare the prediction value for each of the one or more first CI conditional control instructions in the prediction table circuit at the updated prediction address pointer for each of the one or more first CI conditional control instructions to the actual resolved condition for each of the one or more first CI conditional control instructions; and in response to the prediction value for each of the one or more first CI conditional control instructions not matching the actual resolved condition of each of the one or more first CI conditional control instructions at execution, update the prediction value for each of the one or more first CI conditional control instructions in the prediction table circuit at the updated prediction address pointer for each of the one or more first CI conditional control instructions.

18. The processor of claim 16, wherein the instruction processing circuit is further configured to, after fetching the one or more second CD conditional control instructions in the second CD instruction region of the first conditional control instruction based on the resolved condition of the first conditional control instruction:

speculatively re-predict a condition of the one or more first CI conditional control instructions in the CI instruction region; and perform a second update of the one or more first CI prediction entries of the first speculative prediction history indicator based on the respective speculative re-prediction of the one or more first CI conditional control instructions.

19. The processor of claim 18, wherein the instruction processing circuit is further configured to:

determine if the speculatively re-predicted condition of the one or more first CI conditional control instructions in the CI instruction region matches the speculatively predicted condition of the one or more first CI conditional control instructions in the CI instruction region; and in response to the speculatively re-predicted condition of the one or more first CI conditional control instructions not matching the speculatively predicted condition of the one or more first CI conditional control instructions in the CI instruction region:

re-process the one or more first CI conditional control instructions based on the first speculative prediction history indicator with the second updated one or more first CI prediction entries.

20. The processor of claim 18, wherein the instruction processing circuit is further configured to:

fetch a plurality of instructions following the one or more first CI conditional control instructions;

speculatively re-predict a condition of the one or more first CI conditional control instructions in the CI instruction region; and update the one or more first CI prediction entries of the first speculative prediction history indicator based on the respective speculative re-prediction of the one or more first CI conditional control instructions.

21. A method of restoring speculative history used for making one or more speculative predictions for conditional control instructions in a processor, comprising:

speculatively predicting a condition in a first conditional control instruction in an instruction stream in a first instruction pipeline based on a first speculative prediction history indicator;

speculatively predicting a condition of one or more first control dependent (CD) conditional control instructions in a first CD instruction region following the first conditional control instruction in the instruction stream;

speculatively predicting a condition of one or more first control independent (CI) conditional control instructions in a CI instruction region following the first CD instruction region in the instruction stream;

updating one or more first CI prediction entries of the first speculative prediction history indicator based on the respective speculative prediction of the one or more first CI conditional control instructions in the CI instruction region;

executing the first conditional control instruction to resolve the condition of the first conditional control instruction; and in response to the speculative prediction of the first conditional control instruction not matching the resolved condition in execution of the first conditional control instruction:

storing the one or more first CI prediction entries of the first speculative prediction history indicator;

fetching one or more second CD conditional control instructions in a second CD instruction region of the first conditional control instruction based on the resolved condition of the first conditional control instruction;

speculatively predicting a condition of the one or more second CD conditional control instructions in the second CD instruction region; and restoring the stored one or more first CI prediction entries of the first speculative prediction history indicator in the first speculative prediction history indicator.

22. The method of claim 21, further comprising:

updating one or more CD prediction entries of the first speculative prediction history indicator based on the respective speculative prediction of the one or more first CD conditional control instructions in the first CD instruction region; and restoring the stored one or more first CI prediction entries of the first speculative prediction history indicator after updating the one or more CD prediction entries of the first speculative prediction history indicator based on the respective speculative prediction of the one or more second CD conditional control instructions in the second CD instruction region.

23. The method of claim 21, further comprising, in response to the restoring the stored one or more first CI prediction entries of the first speculative prediction history indicator:

processing the one or more first CI conditional control instructions based on the first speculative prediction history indicator with the restored one or more first CI prediction entries.

24. The method of claim 21, further comprising, in response to the restoring the stored one or more first CI prediction entries of the first speculative prediction history indicator:

speculatively re-predicting the condition of the one or more first CI conditional control instructions in the CI instruction region; and updating the one or more first CI prediction entries of the first speculative prediction history indicator based on the respective speculative re-prediction of the one or more first CI conditional control instructions.

25. The method of claim 24, further comprising speculatively predicting the condition of each of the one or more first CI conditional control instructions in the CI instruction region based on a prediction value in a prediction table circuit at a prediction address pointer determined based on the first speculative prediction history indicator; and further comprising:
updating the prediction address pointer for each of the one or more first CI conditional control instructions based on a first non-speculative prediction history indicator in response to execution of the one or more first CI conditional control instructions;

generating an actual resolved condition for each of the one or more first CI conditional control instructions based on execution of the one or more first CI conditional control instructions;

comparing the prediction value for each of the one or more first CI conditional control instructions in the prediction table circuit at the updated prediction address pointer for each of the one or more first CI conditional control instructions to the actual resolved condition for each of the one or more first CI conditional control instructions; and updating the prediction value for each of one or more first CI conditional control instructions in the prediction table circuit at the updated prediction address pointer for each of the one or more first CI conditional control instructions, in response to the prediction value for each of the one or more first CI conditional control instructions not matching the actual resolved condition for each of the one or more first CI conditional control instructions at execution.

26. The method of claim 24, further comprising, after fetching the one or more second CD conditional control instructions in the second CD instruction region of the first conditional control instruction based on the resolved condition of the first conditional control instruction:

speculatively re-predicting a condition of the one or more first CI conditional control instructions in the CI instruction region; and updating the one or more first CI prediction entries of the first speculative prediction history indicator based on the respective speculative re-prediction of the one or more first CI conditional control instructions.

* * * * *